(12) United States Patent
Lection et al.

(10) Patent No.: US 6,418,446 B1
(45) Date of Patent: Jul. 9, 2002

(54) METHOD FOR GROUPING OF DYNAMIC SCHEMA DATA USING XML

(75) Inventors: David Bruce Lection, Raleigh, NC (US); Roland Albert Merrick, Evesham (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/259,819

(22) Filed: Mar. 1, 1999

(51) Int. Cl.[7] .............................................. G06F 17/00
(52) U.S. Cl. ...................................... 707/103; 709/203
(58) Field of Search ......................... 707/1, 4, 10, 102, 707/103 R; 709/203, 227

(56) References Cited

U.S. PATENT DOCUMENTS 6,286,010 B1 * 9/2001 Ramachandran et al. ...................... 707/103 R

* cited by examiner

*Primary Examiner*—Diane D. Mizrahi
*Assistant Examiner*—Apu M Mofiz
(74) *Attorney, Agent, or Firm*—Jeanine S. Ray-Yarletts; Marcia L. Doubet

(57) ABSTRACT

A method, system, and computer-readable code for a technique with which data having dynamically variable record formats (such as that created when a dynamic schema is used with a data repository) can be easily and efficiently accommodated, without requiring modification of the code that processes the data each time the underlying data format changes. This mechanism provides a novel way to gather data that may have had changes to its format, and create a structured representation of this data that flexibly adapts to format variations. This novel technique enables all added data fields in a record to be made available for processing and removed data fields to be omitted, without requiring advance knowledge of the added and removed fields. In the preferred embodiment, a DOM tree created from an XML representation of the source data is used by the present invention as it creates an output DOM tree. Optionally, the results of an LDAP query from an LDAP directory can be used as the source data.

18 Claims, 16 Drawing Sheets

FIG. 3A

```
301 <DATA-GROUP ID="Employee-Record"> 302
311  <GROUP ID="Full-Name"> 313
       <STRING ID="Last-Name">
         <VALUE>Smith</VALUE>
       </STRING>
       <STRING ID="First-Name">
         <VALUE>James</VALUE>
       </STRING>
       <STRING ID="Middle-Name">
         <VALUE>Thomas</Value>
       </STRING>
312  </GROUP> 323
321  <GROUP ID="Home-Address">
       <STRING ID="Street-Address">
         <VALUE>1313 Mockingbird Lane</VALUE>
       </STRING> 324
       <STRING ID="City">
         <VALUE>Pittsburgh</VALUE> 325
       </STRING>
       <STRING ID="State">
         <VALUE>PA</VALUE>
       </STRING>
       <NUMBER ID="Zip-Code"> 326
         <VALUE>12345</VALUE>
       </NUMBER> 327
322  </GROUP> 333
331  <GROUP ID="Computer-System">
       <STRING ID="Domain-Name"> 334
         <VALUE>us.ibm.com</VALUE>
       </STRING>
       <STRING ID="User-ID"> 335
         <VALUE>JTSmith</VALUE>
       </STRING>
332  </GROUP>
341  <STRING ID="Empl-ID-Nbr"> 343
       <VALUE>E12346</VALUE>
342  </STRING>
302 </DATA-GROUP>
```

FIG. 3C

```
361 <GATHER DEST-DATA-GROUP-ID="Restructured-Employee-Record" SOURCE- DATA-GROUP-ID="Employee-Record">
371   <REQUIRED>
        <GROUP ID="RequiredFieldGroup">
          <CAPTION>Person's Full Name</CAPTION>
375       <DATA ID="First-Name"/>
376       <DATA ID="Middle-Name"/>
          <DATA ID="Last-Name"/>
        </GROUP>
372   </REQUIRED>
381   <OPTIONAL>
        <GROUP ID="OptionalFieldGroup">
          <CAPTION>Optional Information</CAPTION>
          <DATA ID="Nickname"/>
          <DATA ID="Mainframe-Identifier"/>
          <DATA ID="User-ID"/>
          <DATA ID="Domain-Name"/>
        </GROUP>
382   </OPTIONAL>
      <EXCLUDE>
        <DATA ID="Maiden-Name"/>
        <DATA ID="Empl-ID-Nbr"/>
      </EXCLUDE>
394   <OTHER ID="OtherFieldsGroup">
        <CAPTION>Miscellaneous Fields</CAPTION>
395   </OTHER>
362 </GATHER>
```

FIG. 3E

```
<DATA-GROUP ID="Restructured-Employee-Record">
    <GROUP ID="RequiredFieldGroup">
        <CAPTION>Person's Full Name</CAPTION>
        <STRING ID="First-Name">
            <VALUE>James</VALUE
        </STRING>
        <STRING ID="Middle-Name">
            <VALUE>Thomas</VALUE>
        </STRING>
        <STRING ID="Last-Name">
            <VALUE>Smith</Value>
        </STRING>
    </GROUP>
    <GROUP ID="OptionalFieldGroup">
        <CAPTION>Optional Information</CAPTION>
        <STRING ID="User-ID">
            <VALUE>JTSmith</VALUE>
        </STRING>
        <STRING ID="Domain-Name">
            <VALUE>us.ibm.com</VALUE>
        </STRING>
    </GROUP>
    <GROUP ID="OtherFieldsGroup"> 399
        <CAPTION>Miscellaneous Fields</CAPTION>
        <STRING ID="Street-Address">
            <VALUE>1313 Mockingbird Lane</VALUE>
        </STRING>
        <STRING ID="City">
            <VALUE>Pittsburgh</VALUE>
        </STRING>
        <STRING ID="State">
            <VALUE>PA</VALUE>
        </STRING>
        <NUMBER ID="Zip-Code">
            <VALUE>12345</VALUE>
        </NUMBER>
    </GROUP>
</DATA-GROUP>
```

METHOD FOR GROUPING OF DYNAMIC SCHEMA DATA USING XML

BACKGROUND OF THE INVENTION

1. Field of the Invention

The present invention relates to a computer system, and deals more particularly with a method, system, and computer-readable code for grouping dynamic schema data using Extensible Markup Language notation.

2. Description of the Related Art

The International Business Machines ("IBM") Software Glossary defines a "schema" as "The set of statements, expressed in a data definition language, that completely describe the structure of a database." (This Software Glossary is located on the World Wide Web at www.networking.ibm.com/nsg.) These statements provide a logical view of the database structure, including the layout format of the database records as well as relationship information. The layout information includes which fields appear in each record, the data type for each field (such as whether it is numeric, binary, character, image, etc.). Relationship information specifies how various fields are related within the database. For example, for data that has a hierarchical structure, parent and child relationships will be described in the schema.

A recent advance in the database art, including directory databases and other types of data repositories, is the notion of a dynamic schema. Originally, databases supported records that had a fixed, predefined format. The schema for these databases was therefore static and predetermined as well. If the structure of a group of records in the database changed—such as adding a new field—then the schema and all the records of that group had to be rebuilt to reflect the change. If a rebuilt record had no value for a newly-added field, that field was still present for the record but remained empty. This resulted in inefficient use of storage space. With a dynamic schema, on the other hand, each addressable record in the data repository can have a different number of fields. Only those records that are individually affected by a schema change need to be rewritten in the data repository to reflect the changed format.

For example, consider a directory database that contains information about a company's employees. ("Directory database", or simply "directory", is a term known in the art that reflects the recent trend of using the information stored in a data repository as an on-line directory of information.) Further suppose that this example directory contains information about the employees, such as their name and home address, employee identification number, social security number, etc., and that the company uses this directory to store information about each employee's computer access privileges. The company may have a number of different types of computer systems. Some employees may have access to all the different systems, while other employees have access to only one or perhaps to none of the systems. For each different computer system, different types of information may be pertinent. The database systems of the past, with their fixed schema, would have required each employee record to contain all the fields for each potential system (making the records, in effect, a union of the possible fields) even though many of the fields would be unused. Or, the information for each employee would have to have been segmented, so that the different types of information were stored in separate homogeneous repositories. Data repositories for which dynamic schema can be used, however, simply store the relevant fields for each record and omit those that are not relevant. In the employee information directory discussed above, if an employee for whom a directory record exists is subsequently granted access to another computer system, the pertinent fields and values are simply added to the employee's record. Thus, one employee's record may be quite different in format from another employee's record.

One example of database directories that support dynamic schema is what is commonly referred to as an "X.500 directory". This terms refers to ITU Recommendation X.500, which specifies a particular approach to implementation of a directory service. This information is also published as an international standard in ISO/IEC 9594-1, "The Directory: Overview of Concepts, Models, and Services" (1995). An "X.500 directory" is a directory service according to these specifications. X.500 directories are widely used in the Internet and World Wide Web (hereinafter, "Web") for providing centralized storage and management of information. The X.500 specification defines a default schema, and provides for extending and customizing the schema according to the requirements of a particular implementation.

While a dynamic schema provides a convenient and efficient means for storing records of different formats in a data repository, the dynamically varying formats on a record-by-record basis can cause problems for other programs that need to process this stored data. Programs are typically written to expect a known data format. If a dynamic schema is used, a program processing the data in the conventional manner has no technique—other than rewriting the code—for processing new fields that have been added or preventing the processing of fields that have been removed. In addition, when record format can vary widely from one record to another (such as in the employee directory example discussed above), existing techniques for processing the data require code that is pre-written to accommodate each potential variation. At best, a user of the program will be presented with an inaccurate depiction of the data content when the format of the information changes. In the worst case, the program will cease to operate properly as the fields it expects are no longer present, and will have to be rewritten. The difficulty of keeping code synchronized with dynamically changing underlying data formats will be apparent.

Accordingly, a need exists for a technique with which data having dynamically variable record formats can be easily and efficiently accommodated, without requiring modification of the code that processes the data each time the underlying data format changes. The present invention provides a novel way to gather data that may have had changes to its format, and create a structured representation of this data that flexibly adapts to format variations. This novel technique enables all added data fields in a record to be made available for processing and removed data fields to be omitted, without requiring advance knowledge of the added and removed fields.

SUMMARY OF THE INVENTION

An object of the present invention is to provide a technique whereby data from a dynamic schema, having dynamically variable record formats, can be easily and efficiently accommodated by program code processing that data, without requiring modification of the code that processes the data each time the underlying data format changes.

Another object of the present invention is to provide a technique for gathering data that may have had changes to its format, and creating a structured representation of this data that flexibly adapts to format variations.

Still another object of the present invention is to provide this technique whereby all added data fields in a record are made available for processing and removed data fields are omitted, without requiring advance knowledge of the added and removed fields.

It is another object of the present invention to provide this technique using a DOM tree created from an XML syntax representation of the source data, and creating an output DOM tree in which the destination data gathered from the source is reformatted and stored.

Yet another object of the present invention is to provide this technique whereby the results of an LDAP query from an LDAP directory can be used as the source data.

A further object of the present invention is to provide a technique whereby fields that are required to be present in the source data can be specified as required in the destination data.

Yet another object of the present invention is to provide a technique for specifying that fields from the source data are to be excluded when creating the destination data.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention provides a software-implemented process, a system, and a method for use in a computing environment, for gathering data having dynamically variable record formats such as those created when a dynamic schema is used with a data repository. This technique comprises: providing an input data source comprising one or more records, wherein each of the records has this dynamically variable record format, and wherein the dynamically variable record format of each record comprises a plurality of dynamically variable fields; processing a gather verb specification, wherein the gather verb specification identifies a selected one of the records from the input data source and an output data destination; gathering the dynamically variable fields from the selected one of the records according to the gather verb specification; and transferring the gathered dynamically variable fields to the output data destination according to the gather verb specification, wherein the gathering and the transferring flexibly adapt to a presence or an absence of the dynamically variable fields. The selected record may be formatted as a first Document Object Model (DOM) tree, the gather verb specification may be formatted as a second DOM tree, and the output data destination may be formatted as a third DOM tree. Optionally, the first DOM tree may be created by parsing an Extended Markup Language (XML) representation of the selected record and the second DOM tree may be created by parsing an XML representation of the gather verb specification. Preferably, the gather verb specification further identifies: a required group of fields, an optional group of fields, an excluded group of fields, and an other group of fields, wherein one or more of the optional group, the excluded group, and the other group may be empty. The gathering preferably further comprises: locating a field from the dynamically variable fields corresponding to each of the fields in the required group, and generating an error if any of the fields in the required group cannot be located; locating a field from the dynamically variable fields corresponding to each of the fields in the optional group if the corresponding field is present in the selected record; locating a field from the dynamically variable fields corresponding to each of the fields in the excluded group if the corresponding field is present in the selected record; and locating all fields from the dynamically variable fields that did not correspond to any of the fields in the required, optional, or excluded groups. The transferring preferably further comprises: transferring each of the fields located by the first locating process to a corresponding required output field in the output data destination; transferring each of the fields located by the second locating process to a corresponding optional output field in the output data destination; preventing transfer of each of the fields located by the third locating process to the output data destination; and transferring each of the fields located by the fourth locating process to a corresponding other output field in the output data destination. The input data source may represent a result of a query from a directory database, and this directory database may be accessed using a Lightweight Directory Access Protocol (LDAP).

The present invention will now be described with reference to the following drawings, in which like reference numbers denote the same element throughout.

BRIEF DESCRIPTION OF THE DRAWINGS

FIGS. 3A–3E illustrate an example of a source data group, a corresponding DOM tree, a specification for gathering data from that source data group and transferring it to a destination data group, and the resulting destination DOM tree and output data group according to the present invention.

DESCRIPTION OF THE PREFERRED EMBODIMENT

Figure 1:
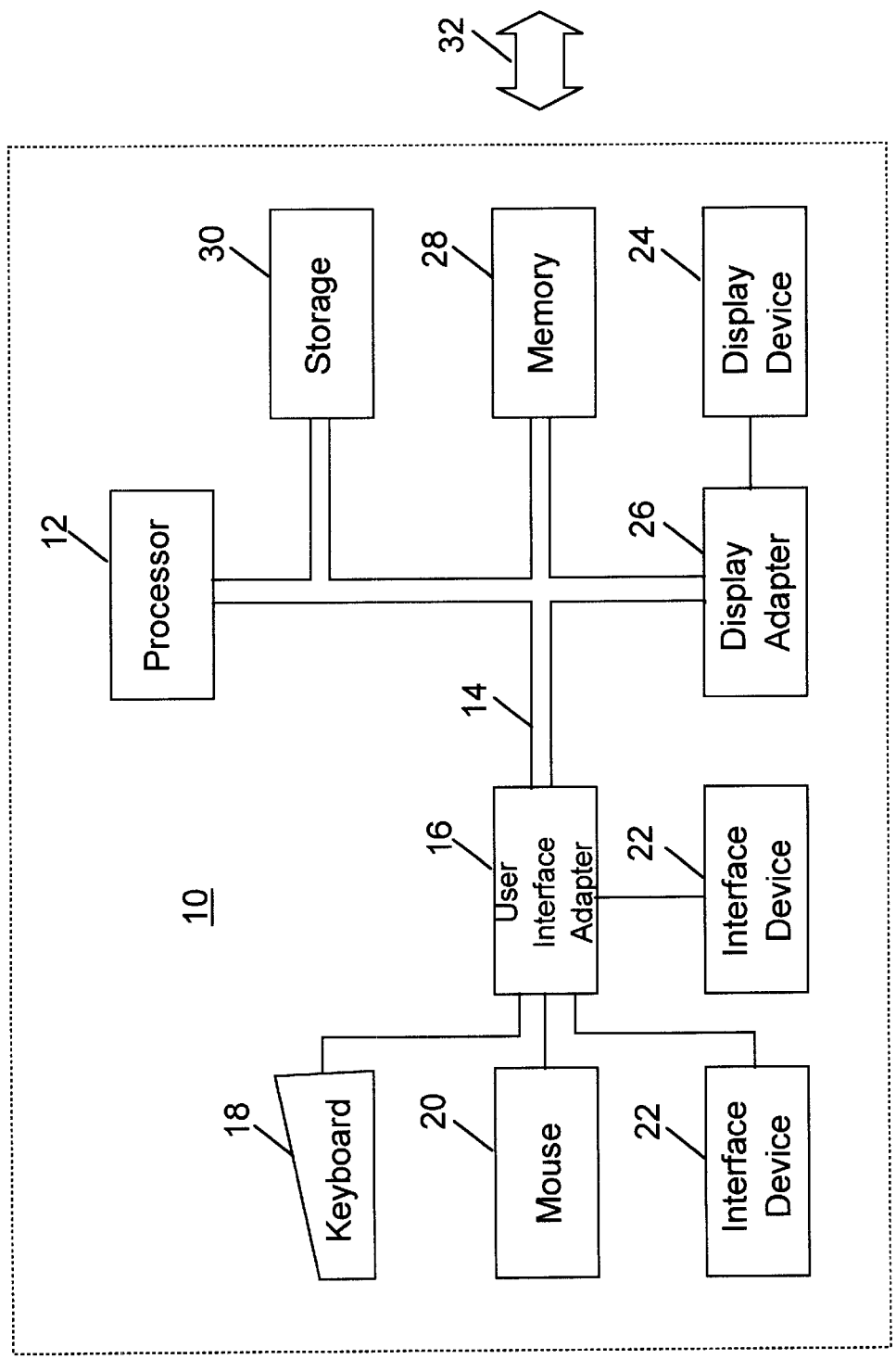
FIG. 1 is a block diagram of a computer workstation environment in which the present invention may be practiced.

FIG. 1 illustrates a representative workstation hardware environment in which the present invention may be practiced. The environment of FIG. 1 comprises a representative single user computer workstation 10, such as a personal computer, including related peripheral devices. The workstation 10 includes a microprocessor 12 and a bus 14 employed to connect and enable communication between the microprocessor 12 and the components of the workstation 10 in accordance with known techniques. The workstation 10 typically includes a user interface adapter 16, which connects the microprocessor 12 via the bus 14 to one or more interface devices, such as a keyboard 18, mouse 20, and/or other interface devices 22, which can be any user interface device, such as a touch sensitive screen, digitized entry pad, etc. The bus 14 also connects a display device 24, such as an LCD screen or monitor, to the microprocessor 12 via a display adapter 26. The bus 14 also connects the microprocessor 12 to memory 28 and long-term storage 30 which can include a hard drive, diskette drive, tape drive, etc.

The workstation 10 may communicate with other computers or networks of computers, for example via a communications channel or modem 32. Alternatively, the workstation 10 may communicate using a wireless interface at 32, such as a CDPD (cellular digital packet data) card. The workstation 10 may be associated with such other computers in a local area network (LAN) or a wide area network (WAN), or the workstation 10 can be a client in a client/server arrangement with another computer, etc. All of these configurations, as well as the appropriate communications hardware and software, are known in the art.

Figure 2:
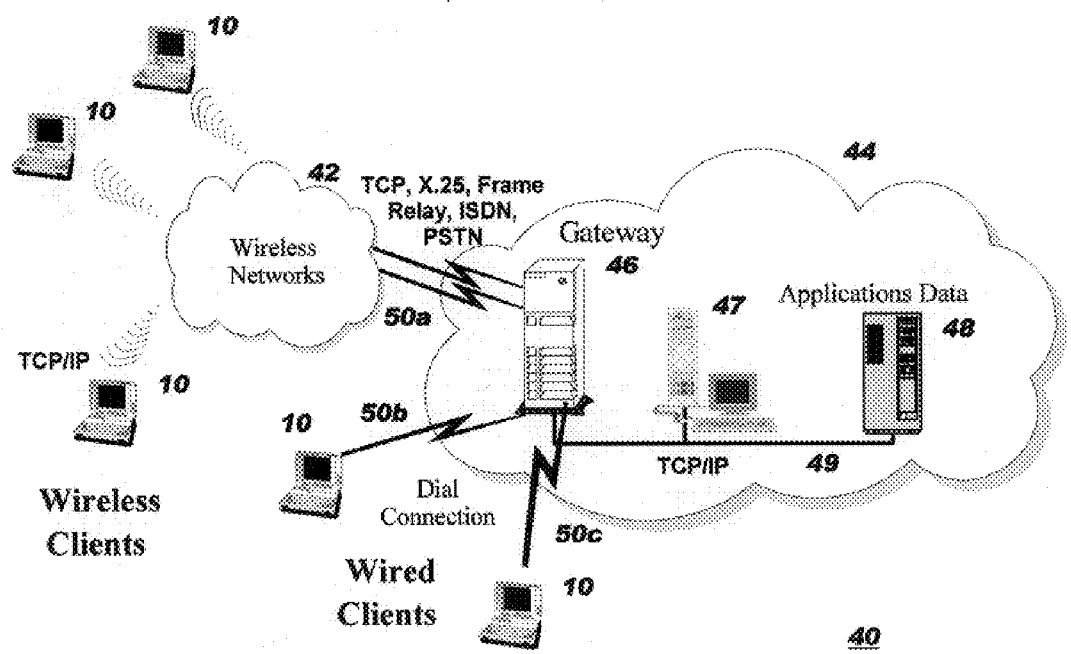
FIG. 2 is a diagram of a networked computing environment in which the present invention may be practiced.

FIG. 2 illustrates a data processing network 40 in which the present invention may be practiced. The data processing network 40 may include a plurality of individual networks, such as wireless network 42 and network 44, each of which may include a plurality of individual workstations 10. Additionally, as those skilled in the art will appreciate, one or more LANs may be included (not shown), where a LAN may comprise a plurality of intelligent workstations coupled to a host processor.

Still referring to FIG. 2, the networks 42 and 44 may also include mainframe computers or servers, such as a gateway computer 46 or application server 47 (which may access a data repository 48). A gateway computer 46 serves as a point of entry into each network 44. The gateway 46 may be preferably coupled to another network 42 by means of a communications link 50a. The gateway 46 may also be directly coupled to one or more workstations 10 using a communications link 50b, 50c. The gateway computer 46 may be implemented utilizing an Enterprise Systems Architecture/370 available from IBM, an Enterprise Systems Architecture/390 computer, etc. Depending on the application, a midrange computer, such as an Application System/400 (also known as an AS/400) may be employed. ("Enterprise Systems Architecture/370" is a trademark of IBM; "Enterprise Systems Architecture/390", "Application System/400", and "AS/400" are registered trademarks of IBM.)

The gateway computer 46 may also be coupled 49 to a storage device (such as data repository 48). Further, the gateway 46 may be directly or indirectly coupled to one or more workstations 10.

Those skilled in the art will appreciate that the gateway computer 46 may be located a great geographic distance from the network 42, and similarly, the workstations 10 may be located a substantial distance from the networks 42 and 44. For example, the network 42 may be located in California, while the gateway 46 may be located in Texas, and one or more of the workstations 10 may be located in New York. The workstations 10 may connect to the wireless network 42 using a networking protocol such as the Transmission Control Protocol/Internet Protocol ("TCP/IP") over a number of alternative connection media, such as cellular phone, radio frequency networks, satellite networks, etc. The wireless network 42 preferably connects to the gateway 46 using a network connection 50a such as TCP or UDP (User Datagram Protocol) over IP, X.25, Frame Relay, ISDN (Integrated Services Digital Network), PSTN (Public Switched Telephone Network), etc. The workstations 10 may alternatively connect directly to the gateway 46 using dial connections 50b or 50c. Further, the wireless network 42 and network 44 may connect to one or more other networks (not shown), in an analogous manner to that depicted in FIG. 2.

Software programming code which embodies the present invention is typically accessed by the microprocessor 12 of the workstation 10 or server 47 from long-term storage media 30 of some type, such as a CD-ROM drive or hard drive. The software programming code may be embodied on any of a variety of known media for use with a data processing system, such as a diskette, hard drive, or CD-ROM. The code may be distributed on such media, or may be distributed to users from the memory or storage of one computer system over a network of some type to other computer systems for use by users of such other systems. Alternatively, the programming code may be embodied in the memory 28, and accessed by the microprocessor 12 using the bus 14. The techniques and methods for embodying software programming code in memory, on physical media, and/or distributing software code via networks are well known and will not be further discussed herein.

A user of the present invention may connect his computer to a server using a wireline connection, or a wireless connection. Wireline connections are those that use physical media such as cables and telephone lines, whereas wireless connections use media such as satellite links, radio frequency waves, and infrared waves. Many connection techniques can be used with these various media, such as: using the computer's modem to establish a connection over a telephone line; using a LAN card such as Token Ring or Ethernet; using a cellular modem to establish a wireless connection; etc. The user's computer may be any type of computer processor, including laptop, handheld or mobile computers; vehicle-mounted devices; desktop computers; mainframe computers; etc., having processing and communication capabilities. The remote server, similarly, can be one of any number of different types of computer which have processing and communication capabilities. These techniques are well known in the art, and the hardware devices and software which enable their use are readily available. Hereinafter, the user's computer will be referred to equivalently as a "workstation", "device", or "computer", and use of any of these terms or the term "server" refers to any of the types of computing devices described above.

In the preferred embodiment, the. present invention is implemented as one or more computer software programs. The implementation of the software of the present invention may operate on a user's workstation, as one or more. modules (also referred to as code subroutines, or "objects" in object-oriented programming) which are invoked upon request. Alternatively, the software may operate on a server in a network, or in any device capable of executing the program code implementing the present invention. The logic implementing this invention may be integrated within the code of an application program, or it may be implemented as one or more separate utility modules which are invoked by that application, without deviating from the inventive concepts disclosed herein. The application may be executing in a Web environment, where a Web server provides services in response to requests from a client connected through the Internet. Or, the application may be executing in a corporate intranet or extranet, or in any other network environment. Configurations for the environment include a client/server network, as well as a multi-tier environment. These environments and configurations are well known in the art.

The present invention provides for gathering data from a data source in which the format may vary on a record-by-record basis, and creating a differently-formatted representation of that data in a destination data structure. This transformation to the destination data structure flexibly adapts to format variations, without requiring advance knowledge or specification of added or removed fields in the records. Further, the novel concepts of the present invention eliminate the need to rewrite the data-gathering and reformatting logic when the underlying data format changes.

In the preferred embodiment, the source and destination data structures are specified as (1) an XML document using XML syntax or (2) a DOM tree representation of an XML document. XML, which stands for "Extensible Markup Language", is a standardized formatting notation based on the Standard Generalized Markup Language ("SGML"). SGML is an international standard for specifying document structure. (Refer to ISO 8879, "Standard Generalized Markup Language (SGML)", (1986) for more information on SGML.) XML is a simplified version of SGML, and was originally created as a markup language tailored for enabling structured document interchange on the Web. The syntax of XML is extensible, however, enabling it to be used to represent any type of structured information. One area in which XML is increasingly important is with on-line directories stored in data repositories such as those previously described. XML notation can be used to specify the format of records in a directory (as well as the values to be used in the records), and its extensibility makes it well-suited for use with dynamic schema. When additional fields are to be added to a data record, the XML syntax representing those fields (and the corresponding values) can be specified for the record. For a record that does not need to use the added fields, the XML syntax merely omits specification of the additional fields. (Refer to "Extensible Markup Language (XML), W3C Recommendation Feb. 10, 1998" which is available on the World Wide Web at http://www.w3.org/TR/1998/REC-xml-19980210, for more information on XML. "XML" is a trademark of Massachusetts Institute of Technology.)

It should be noted that the term "record" is used herein to refer to data stored in a repository. This is for ease of reference, and is not meant to limit the present invention to use with conventional record-oriented repositories. Specifically, representations such as object-oriented formats are to be considered as being within the scope of the present invention. Further, the term "directory" is used herein to refer to information stored in a data repository. This is not meant to limit the present invention to use with data used for directory look-up purposes: the present invention may be used advantageously with data stored in a repository without regard to the semantics or intended use of that data.

XML syntax is a tag language, where specially-designated constructs referred to as "tags" are used to delimit (or "mark up") information. In the general case, a tag is a keyword that identifies what the data is which is associated with the tag, and is typically composed of a character string enclosed in special characters. "Special characters" means characters other than letters and numbers, which are defined and reserved for use with tags. Special characters are used so that a parser processing the data stream will recognize that this a tag. A tag is normally inserted preceding its associated data: a corresponding tag may also be inserted following the data, to clearly identify where that data ends. As an example of using tags, the syntax "<email>" could be used as a tag to indicate that the character string appearing in the data stream after this tag is to treated as an e-mail address; the syntax "</email>" would then be inserted after the character string, to delimit where the e-mail character string ends. The extensibility of XML is provided by allowing users the capability to define their own tags. These user-defined tags then represent the particular data structure applicable for the user's data.

An example of a source data structure specified in XML syntax, upon which the present invention may operate, is shown in FIG. 3A. This example will be used to illustrate the format required for the source data structure used by the present invention. This example represents an employee record 300 from a directory, using the scenario previously discussed. Accordingly, the outer level structure of this record is identified as being of a type "Employee-Record" at 302. This employee record 300 includes the employee's full name 310 (as indicated by the value "Full-Name" of the identifier, or ID, attribute at 313) and home address 320 (as indicated by the identifier at 323), information 330 related to a computer system for which the employee has access privileges (indicated by identifier 333), and an employee identification number 340 (indicated by identifier 343). The nesting of the XML tag pairs such as beginning tag 311 and ending tag 312 (and 321, 322, etc.) within the outermost tag pair 301, 302 indicates that the information bracketed by the inner tag pairs is a logical subgrouping of information within the outermost tags 301, 302 (and therefore within employee record 300). This structure will be obvious to a human reader, and to a properly adapted software program as well (i.e. a software program that understands XML syntax and semantics).

The example source data structure in FIG. 3A illustrates several important points related to operation of the present invention. First, the source data upon which the invention operates must be specified using an outer-level grouping construct such as the beginning tag syntax "<DATA-GROUP ID="identifier">" shown at 301 and the ending tag syntax "</DATA-GROUP>" shown at 302. Other keywords may be used in these outermost tags without deviating from the present invention, such as "GROUP_DATA". What is required is that a predetermined keyword syntax is used to specify the source data, and the gathering function (discussed below with reference to FIGS. 4 through 12) searches for this keyword syntax during its gathering and transformation process. The value of "identifier" within this construct can be any syntactically-correct value according to XML syntax, and will be used by the gathering process to locate the proper source data.

FIG. 3A also illustrates that within the outermost structure (e.g. DATA-GROUP), any number of nested substructures may exist. These substructures may be groups of data, as indicated by a keyword syntax such as "<GROUP ID="group-identifier">" and "</GROUP>" (see, for example, elements 311 and 312). As with the data group identifier, the value of the identifier group-identifier may be any syntactically-correct value chosen by the person specifying the data structure format. In addition, the outermost structure may include substructures that are elementary data (i.e. data that is not grouped within other data items). An example of this type of elementary data is shown in FIG. 3A at 340, where the tag pair 341, 342 specifies the keyword syntax "<STRING ID="string-identifier">" and "</STRING>". (As with the other identifier values, the value of string-identifier is chosen by the user, and may be any representative information that uses correct XML syntax.) The keyword tags STRING and NUMBER (see elements 326, 327) have been shown as possible data element tags. These tags may appear within groups (bracketed by GROUP tags), or as elementary data item tags. In addition, other keyword tags such as <BINARY>, <FLOAT>, <TCP-IP_ADDRESS>, etc. may be used similarly. The following terms will be used hereinafter to refer to the elements of the source data structure (and apply equally to the destination data structure that will be discussed below): a "group of data" refers to the elements within a <GROUP> tag pair; a "data item" refers to any non-aggregation of data (i.e. the elementary data items); and "data entity" refers to both data items and groups of data. Notably, a group is not within the definition of "data item".

The name scoping used by the present invention requires that each lowest-level identifier within each group is uniquely named within that group. The data item corresponding to an identifier can then be represented by concatenating its identifier to the higher-level identifiers. As an example of using identifier concatenation, the value "Pittsburgh" at element 325 of FIG. 3A can be referred to by the concatenated identifier string "Employee-Record.Home-Address.City". As an example of the name scoping requirement, the data item identifier "User-ID" at 335 cannot be repeated within the group "Computer-System" 333; however, this "User-ID" identifier could be used for a data item within a different group (such as the group at 313), where the different group identifier provides the data item identifier with a unique scope.

FIG. 3A also illustrates that the source data group will contain values for the various data items. For example, the data item having identifier "City" 324 has the value "Pittsburgh" shown at 325. Values for data items are indicated in FIG. 3A using the keyword syntax "<VALUE>" and "</VALUE>", but an alternative keyword syntax may be used without deviating from the inventive concepts disclosed herein. As is obvious to one of ordinary skill in the art, employee records for other employees will be similar in structure and keyword syntax to employee record 300, but will have different values for one or more of the data items. With the dynamic schema for which the present invention is adapted, records of a particular type—such as the records for other employees that are stored in a repository along with the record 300 of FIG. 3A—may have the same data entities, fewer data entities, or more data entities from one source record to another. For example, if an employee does not have access to any computer systems, the entire group 330 may be omitted. Or, if an employee has access to multiple computer systems, additional groups corresponding to those systems may be present in the source data, having a structure similar to that of group 330 (requiring, of course, an identifier value for each additional group tag that is distinguishable from the value of the identifier at 333). Or, because of the dynamic schema, the structure of additional groups specifying computer system data may be different from the structure of group 330, as has been previously stated. For example, instead of Domain-Name 334 and User-ID 335 data items, other computer systems may use information such as "Mainframe-Identifier", "Department-to-be-Charged", and "User-Account-Number" as data items (not shown).

Records representing any type of structured source information may be specified for use by the present invention in a similar manner to the record depicted in FIG. 3A, with appropriate groups of data and data entities specified within the outermost data group, according to the structure of the particular source information.

As stated above, a DOM tree representation of an XML document is an alternative form for the source data of the preferred embodiment. If source data is specified in XML syntax (as in FIG. 3A), it will be converted for use by the present invention into a corresponding DOM tree representation, by parsing the XML document using techniques which are known in the art and do not form part of the present invention. Document Object Model, or "DOM", is a language-independent application programming interface ("API") for use with documents specified in SGML or a derivative of SGML. In particular, DOM is intended for use with the HyperText Markup Language ("HTML") and XML derivatives of SGML. DOM is published as a Recommendation of the World Wide Web Consortium, titled "Document Object Model (DOM) Level 1 Specification, Version 1.0" (1998) and available on the World Wide Web at http://www.w3.org/TR/REC-DOM-Level-1. ("DOM" is a trademark of Massachusetts Institute of Technology.)

The DOM API enables application programs to access a tree-oriented abstraction of a document. It is this tree-oriented form that is created from the XML document by an XML parser. An application program can manipulate document structure and contents (that is, by changing, deleting, and/or adding elements in the DOM tree). Further, the DOM enables navigating the structure of the document by navigating the corresponding tree. While the term "document" is used herein when discussing XML and the corresponding DOM trees, it is to be understood that the information represented using XML may represent any type of information, and is not limited to the traditional interpretation of the word "document". For example, XML may be used to represent the layout of records in a data repository (as in the examples used herein), the layout of a user interface for an application program, or the data to be used with a program or to be used as the values of records in a repository. For ease of reference, the term "document" will be used herein to refer to these diverse types of information. "DOM tree" refers to the logical structure with which a document (in the preferred embodiment, an XML document) is modeled using the DOM. A DOM tree is a hierarchical representation of the document structure and contents. Each DOM tree has a root node and one or more leaf nodes, with zero or more intermediate nodes, using the terminology for tree structures that is commonly known in the computer programming art. A node's predecessor node in the tree is called a "parent" and nodes below a given node in the tree are called "child" nodes.

While the DOM applies to both HTML and XML, HTML is not pertinent to the scope of the present invention. Thus, the subsequent DOM discussions will be in terms of using the DOM with XML.

When an XML parser processes an XML file, it reads the file and constructs a DOM tree based on the syntax of the tags embedded in the file and the interrelationships between those tags. The tag syntax is stored in the nodes of the DOM tree, and the shape of the tree is determined from the tag relationships. The DOM specification is defined to provide "structural isomorphism"—that is, any XML parser that parses a given XML input file will create an identical DOM tree. The DOM interface is used to change the structure and/or contents of the DOM tree, as well as to navigate the tree structure, as previously stated. For purposes of the present invention, a separate DOM tree will be created by the gathering and transformation process. This created DOM tree represents the restructured output data, automatically adapted to format variations that are possible on a record-by-record basis in the source data. (Optionally, an XML document corresponding to this output DOM, such as that depicted in FIG. 3E, may also be created to reflect this restructured output data.)

Figure 3B:
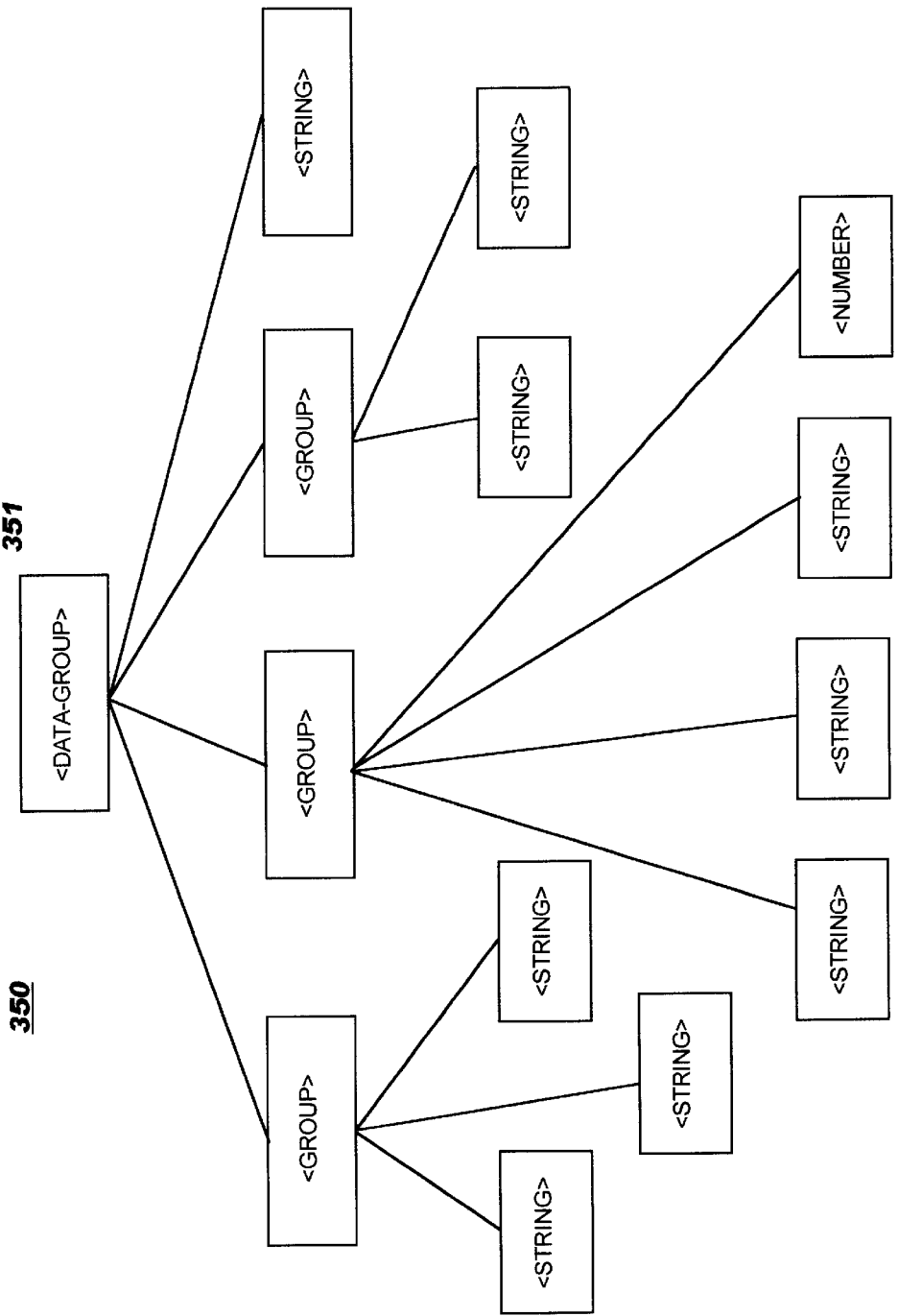
Figure 3D:
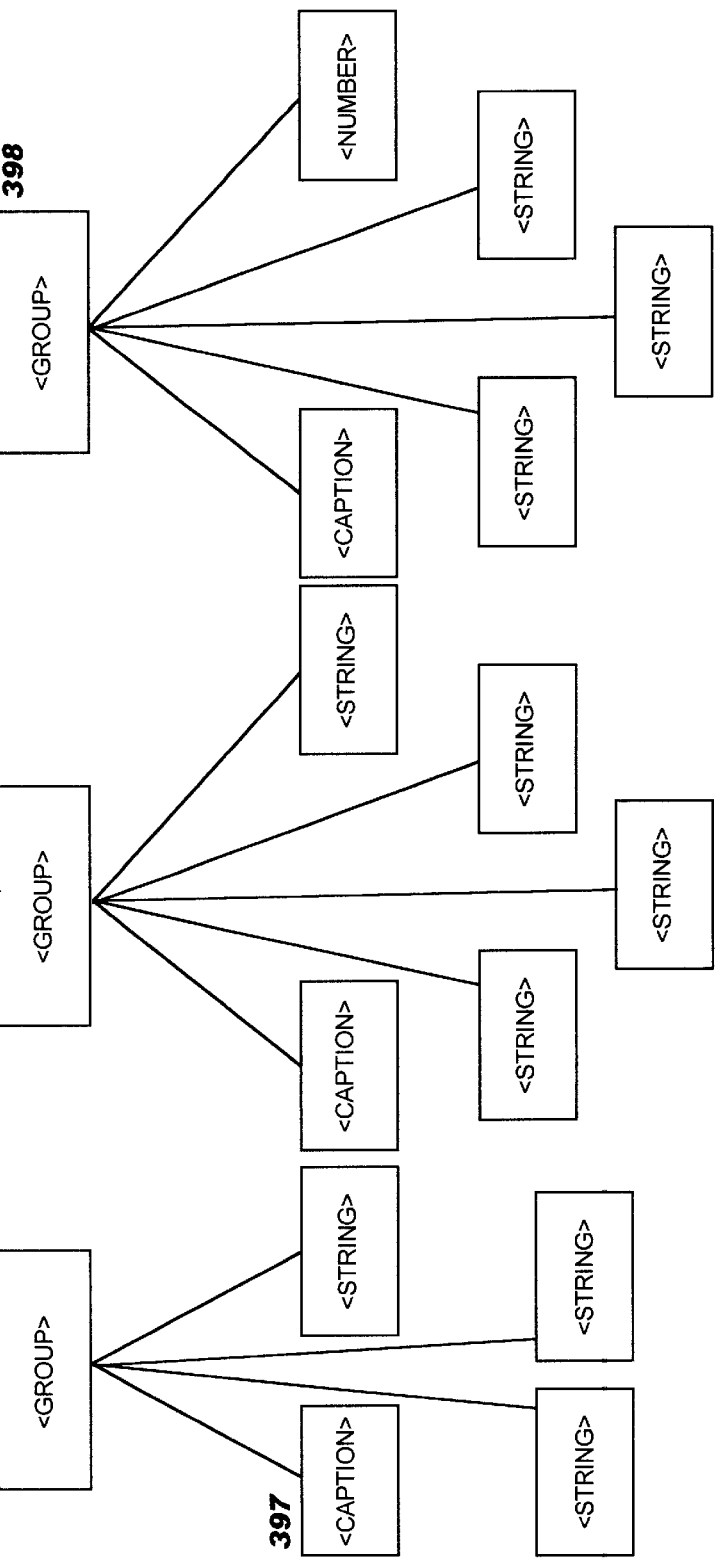
Figure 4:
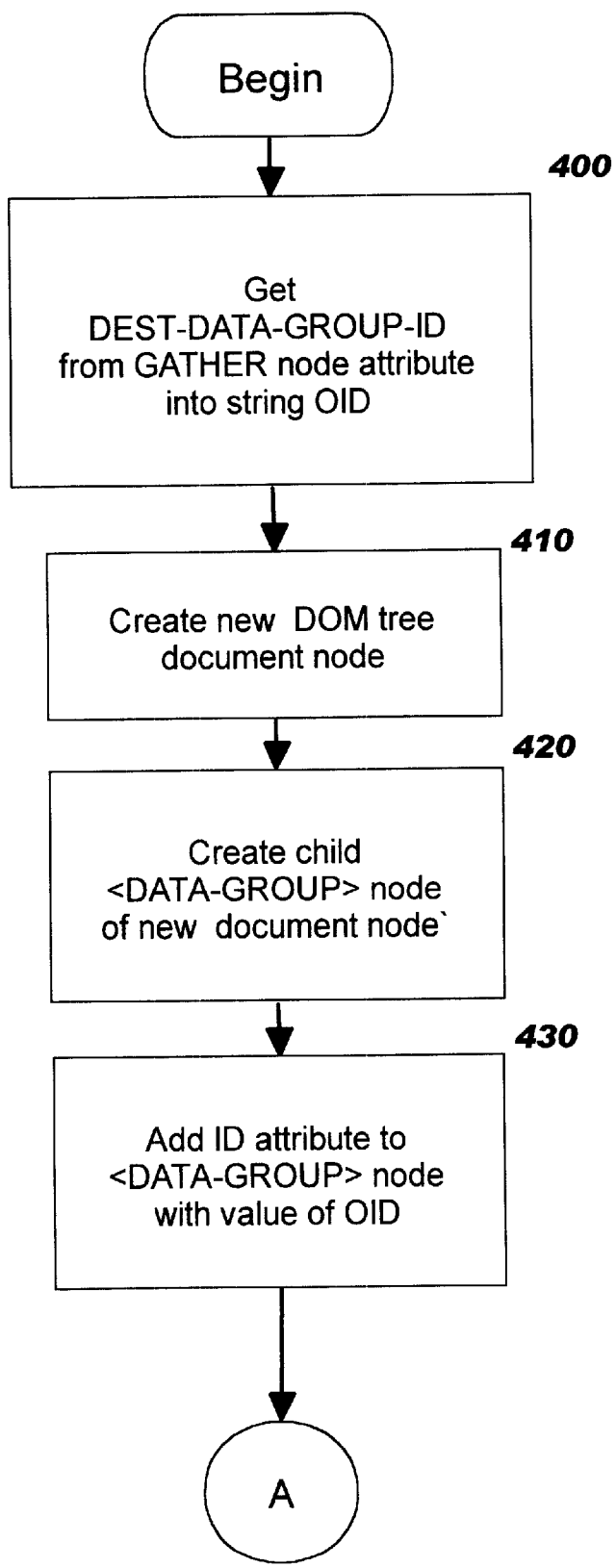
FIGS. 4–12 illustrate flow charts which set forth the logic which may be used to implement a preferred embodiment of the present invention.
Figure 5:
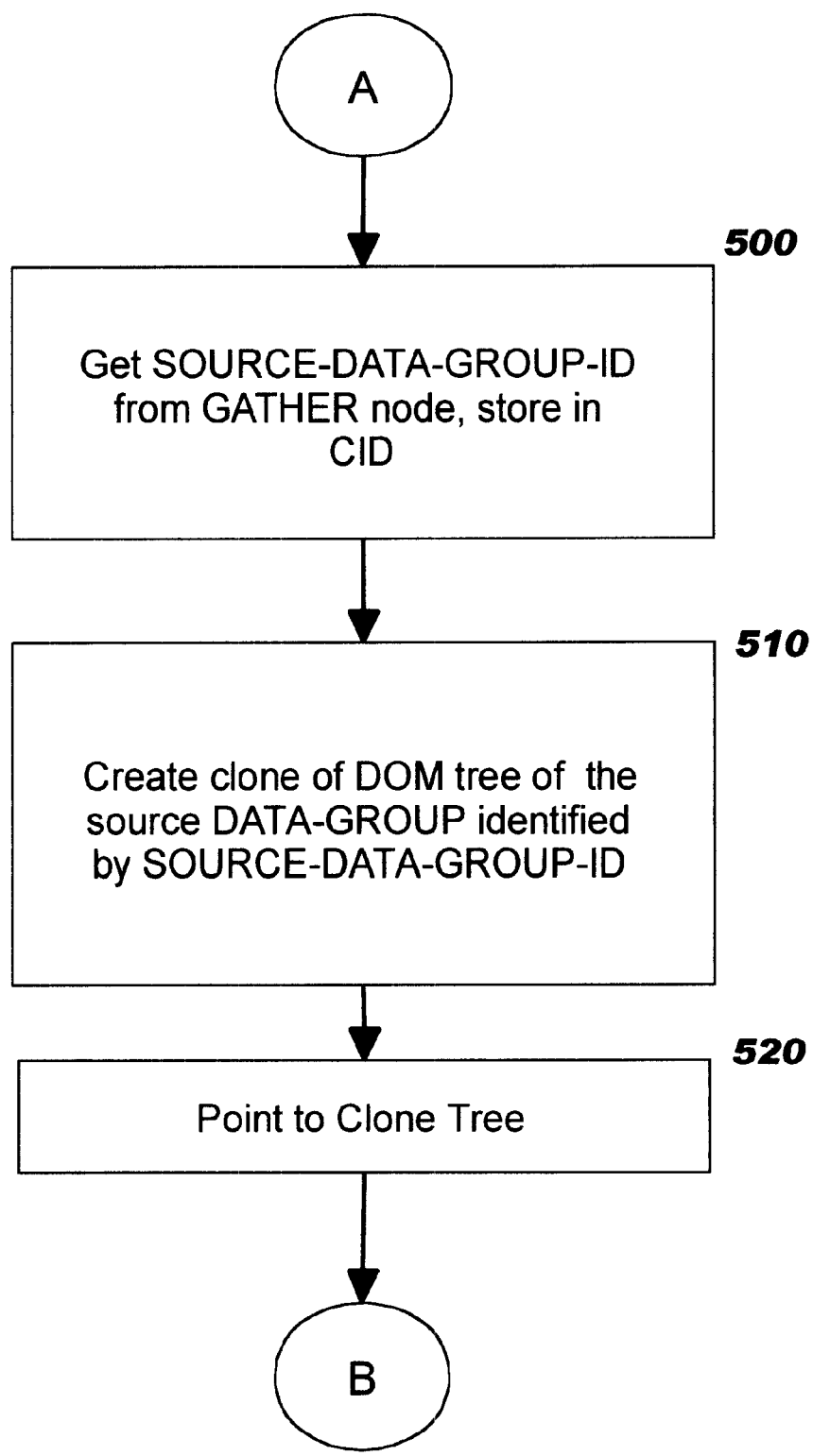
Figure 6:
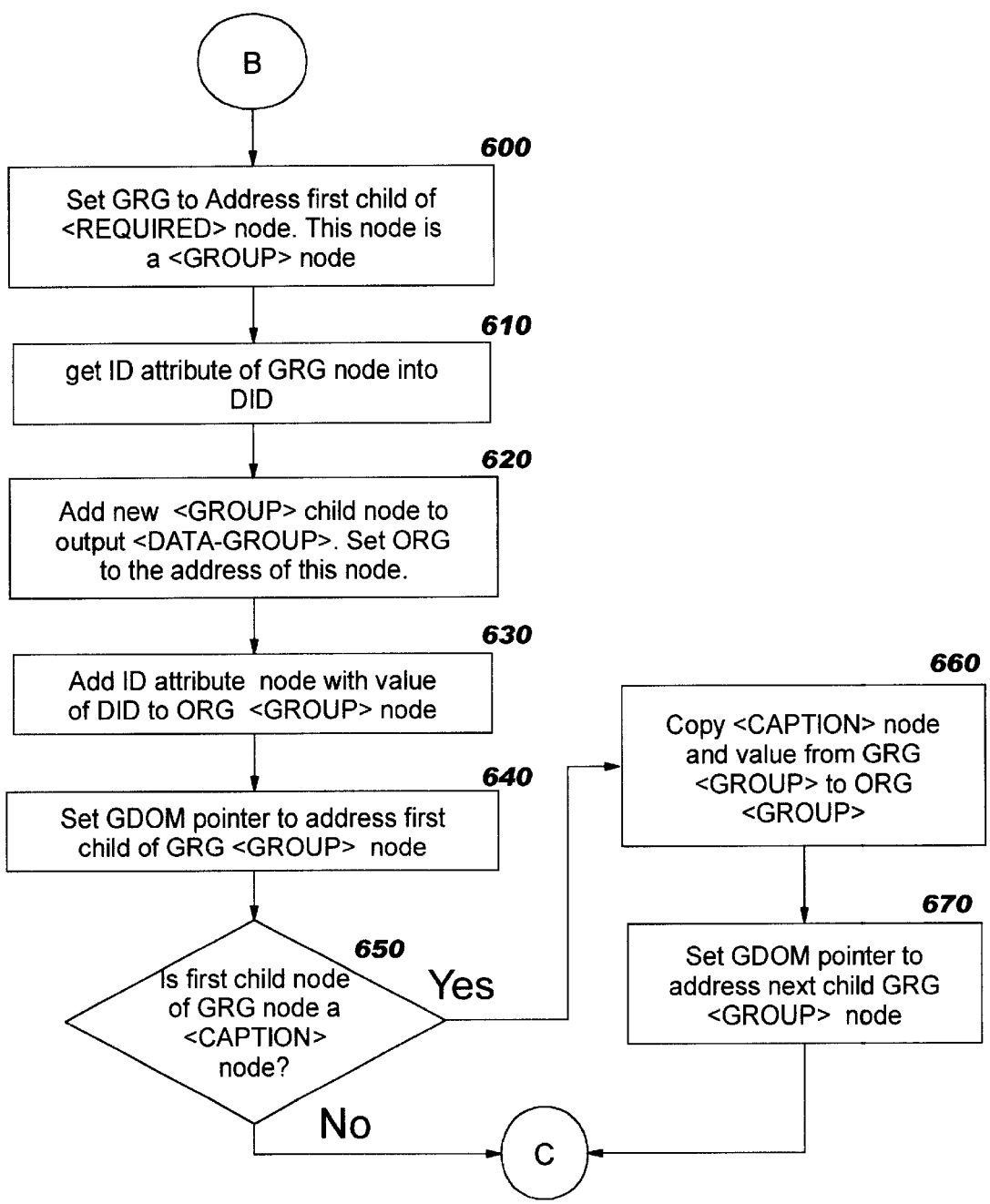
Figure 7:
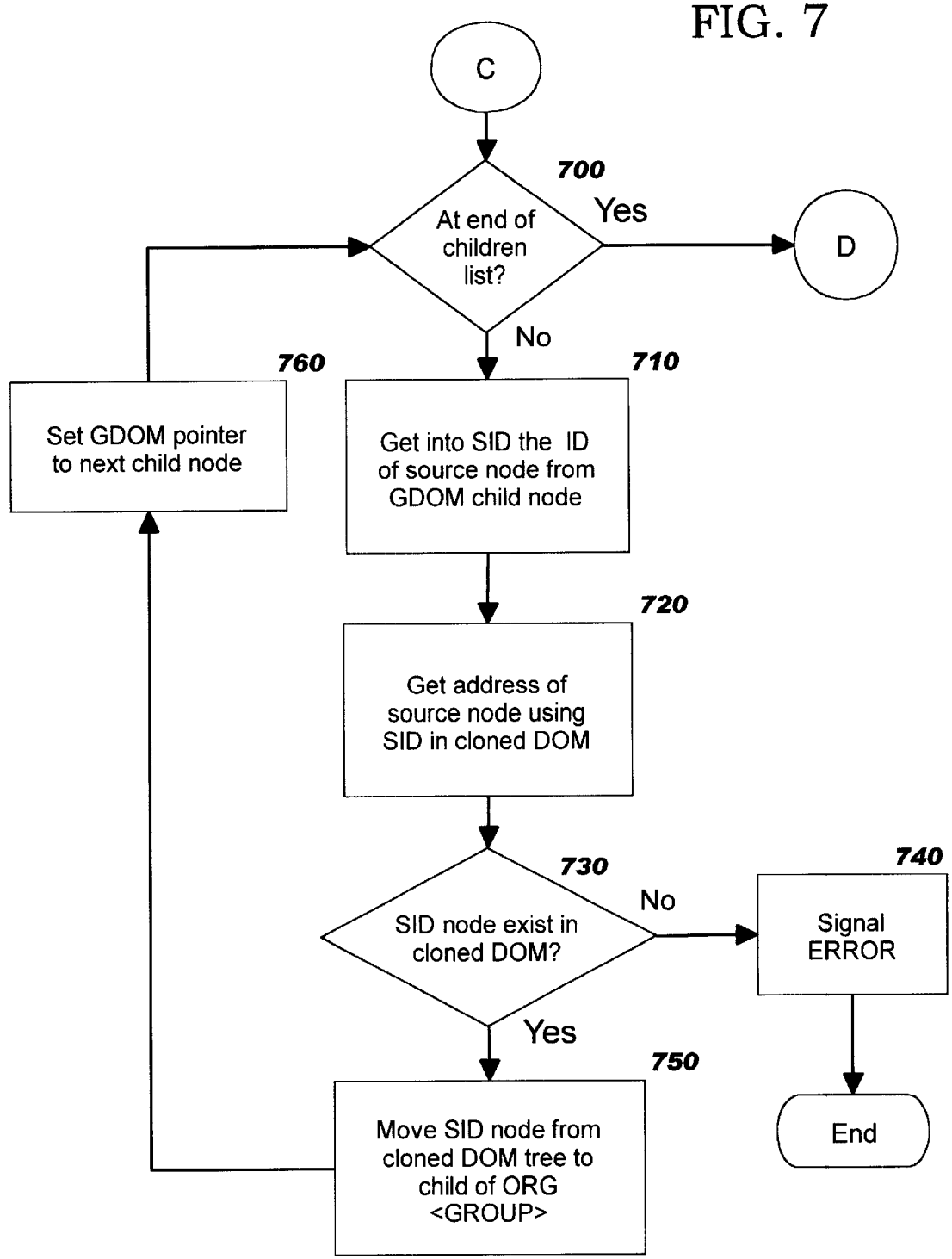

FIG. 3B depicts a DOM tree 350 that corresponds to the XML notation of the source data example in FIG. 3A. The nodes of this DOM tree contain the keyword tags for the data entities of the source data structure: the identifiers and values used at the nodes have not been illustrated. As has been stated, the previous invention operates on source data that has been formatted as a DOM tree, such as this example in FIG. 3B. (Note that the child nodes of the group nodes in FIGS. 3B and 3D are depicted graphically at different horizontal alignments. This is for drafting convenience only. It is to be understood that these child nodes are all logically at the same level within their corresponding trees.)

FIG. 3C shows an example of the syntax of the "GATHER" verb 360 defined by the present invention. It is through invocation of this verb, or API, that the novel concepts of the present invention operate. (As with the other keywords depicted herein, "GATHER" is merely a representative example of the name that might be used in a particular implementation for this function.) Processing of the GATHER invocation will be described in detail below, with reference to the logic depicted in FIGS. 4 through 12. Use of this verb requires specification of (1) a source for the data that is to be operated upon and (2) a destination for the result. These are shown in FIG. 3C using the keywords SOURCE-DATA-GROUP-ID at 365 at DEST-DATA-GROUP-ID at 363. Note that in this example, the value of the SOURCE-DATA-GROUP-ID attribute 365 is "Employee-Record" 366, which is the name used for the source data document shown in FIG. 3A (see element 302 of FIG. 3A). This indicates that the information contained in the XML document of FIG. 3A is to be used as input to the GATHER verb. The destination data group is given an identifier of "Restructured-Employee-Record" 364 for this example. Any syntactically valid identifier may be used for the destination group in actual use, and any identifier corresponding to data structured as a DOM tree or as an XML document (in which case a DOM tree will be created therefrom by an XML parser, as discussed above) may be used for the source group identifier.

The format of the GATHER verb will now be discussed with reference to the example shown in FIG. 3C. Within the outermost tags 361, 362, four distinct types of information may be specified. First is a list of the data items that are required to be present in the source data group, and that will be transferred to the destination data group by the GATHER function. These data items are specified within the <REQUIRED> tag pair 371, 372. Second is a list of the data items that are optionally present in the source data, and which will be transferred to the destination if they are present. These optional data items are specified within the <OPTIONAL> tag pair 381, 382. Third is a list of any data items that are to be excluded from the transfer process. These excluded data items are specified within the <EXCLUDE> tag pair 391, 392. Each of the data items in these first three categories is specifically called out in the GATHER verb syntax. The syntax for specifying an individual data item is to use a tag having a <DATA> keyword (as shown in FIG. 3C at 375, 376, etc.), and including an ID attribute with this keyword (such as those shown at 377, 378) that identifies the data item. The fourth type of information within the GATHER verb is the category that will be referred to herein as "OTHER", which is represented by the tag pair 394, 395. For each type of information, with the exception of the EXCLUDE type, a group identifier (such as shown, at 373) is specified, and a caption (such as shown at 374) may optionally be specified. The group identifier and caption will be used in the destination data group. (The destination data group does not contain elements corresponding to the excluded data items, and thus no identifier or caption is relevant.)

Operation of the GATHER function is as follows: (1) any data entities specified within the REQUIRED group 370 on the verb will be transferred to the required group of the destination DOM tree; (2) any data entities specified within the OPTIONAL group 380 of the GATHER verb will be transferred to the optional group of the output DOM tree; (3) any data entities specified within the EXCLUDE group 390 of the GATHER verb will be prevented from appearing anywhere in the output DOM tree; and (4) any data entities from the source DOM tree that were not specified in the REQUIRED, OPTIONAL, or EXCLUDE groups of the GATHER verb will be transferred to the destination DOM tree representation of the OTHER group 393. Further, if any data entities that were specified in the REQUIRED group 370 do not appear in the source DOM tree, this is an error situation and an exception will be generated. Upon completion of the processing done by the GATHER function, the OTHER group of the output DOM tree will have collected all the data entities that were not specifically called out for transformation according to one of the other 3 groups. This allows any unique or newly-added fields in each record to be collected and preserved for processing, without requiring code to be added for locating each new field and moving each field individually to an output area. Because the transformation code does not have to be modified upon each change to the dynamic schema, and code is not required that can handle each specific field in the union of all possible fields as the schema is changing, the present invention provides a technique for dealing with dynamically-changeable record formats that is less labor-intensive, less expensive,. and less error-prone than in the prior art (where code revision would be required for each schema change).

FIG. 3D shows the output DOM tree corresponding to the example source data in FIGS. 3A and 3B, and the example GATHER invocation in FIG. 3C. Note that while FIG. 3D shows group nodes having child nodes for data items using only the keywords STRING and NUMBER, this is because these keyword tags were the only data entity tags used in the input example of FIG. 3A. If keyword tags such as <TCP_IP_ADDRESS> had been used in the input, corresponding nodes in the output DOM tree would also use these other tags. Also note that FIG. 3D shows groups having only elementary data items as children. If the input in FIG. 3A had used nested groups, then the flowcharts explained below provide for transferring the nested group along with its children as a child of the highest-level corresponding group node in the output DOM tree. This output DOM tree will be discussed in more detail as the logic with which it is created is explained, referring to FIGS. 4 through 12. FIG. 3E shows the output XML document corresponding to this example output DOM tree. As stated earlier, creation of an output XML document is optional. FIG. 3E is provided to illustrate this option, and to provide a more complete understanding of the transformation that occurs as the GATHER function operates. The nodes of the DOM tree in FIG. 3D contain the keyword tags for the data entities of the output data structure: the identifiers and values used at the nodes have not been illustrated. It will be obvious from the description of the GATHER function processing, and by reference to the values in the output XML document in FIG. 3E, which values are associated with which nodes of this output DOM tree.

The manner in which the preferred embodiment of the present invention may be implemented will now be discussed with reference to the flowcharts in FIGS. 4 through 12.

The processing of the preferred embodiment of the present invention begins at Block 400. Note that it is assumed here that the parsing of a source data group expressed in XML notation, creating a source DOM tree, has already occurred. Further, the preferred embodiment uses a DOM tree representation of the GATHER verb in order to take advantage of the efficiencies with which the verb's parameters (i.e. the identification of which data entities are to go into the REQUIRED output group, etc.) can be processed from a DOM tree representation. The parsing of the GATHER verb syntax, and creation of the corresponding DOM tree, uses XML parsing techniques which are known in the art and do not form part of the present invention. This parsing is assumed to be complete upon beginning the logic of FIG. 4. (Hereinafter, the DOM tree created to represent the GATHER verb will be referred to as the "Gather tree".) Block 400 obtains the identifier to be used for the destination group, which the user specified in the coding of the GATHER verb. This identifier is then stored in a variable that is referred to herein as "SID" (for "String Identifier").

Block 410 begins the process of creating the output DOM tree. In implementation, this corresponds to issuing a programming language statement such as "new" or "alloc", indicating that a new DOM tree will now be created that will require allocation of memory or storage, and creating a root node for this tree. A pointer to the root node is also created at this time, for later reference in traversing the tree. Block 420 creates a child node of the root node, where this child node is of type DATA-GROUP. This child node is shown in the example of FIG. 3D as element 396. (The root node has not been shown in FIG. 3D, but appears logically above the just-created child node 396.) Block 430 then associates an identifier attribute with this node, where the identifier is the value stored in varible SID at Block 400. Control then continues with Block 500 of FIG. 5.

Block 500 obtains the identifier of the source data group that was specified on the GATHER verb. This identifier is then stored in a variable that is referred to herein as "CID" (for "Clone Identifier"). Block 510 then creates a clone of the source DOM tree. As is known in the art, a clone of a tree structure is a copy of that structure, where the node relationships and contents are maintained intact during the copy process. Techniques for cloning tree structures are known in the art. At Block 520, a pointer to the root of this clone is created and stored in a variable that will be referred to herein as "clone-pointer". As will become apparent from further discussions of the processing of the GATHER function, a clone is used so that pieces of the tree structure can be selectively deleted (from the clone) without alteration of the source tree structure. Processing continues at Block 600 of FIG. 6.

At Block 600, the processing of the REQUIRED group 370 begins. A pointer referred to herein as "GRG", for "Gather Required Group", is set to address (i.e. point to) the first child node of the REQUIRED node from the GATHER tree. As indicated in Block 600, this first child node will be a GROUP node according to the syntax requirements of the present invention. Block 610 obtains the value of the ID attribute associated with this child node, and stores that value into the variable DID ("Destination ID").

Block 620 creates a new node in the output DOM, as a child of the DATA-GROUP node. This child node is of the type GROUP, and will be used. to group all the data entities together that the user specified on the GATHER verb as required. A pointer ORG ("Output Required Group") is set to point to this node. Block 630 then associates the identifier stored by Block 610 in the variable DID with this new group node.

Block 640 sets a GDOM ("Gather DOM") pointer to point to the first child of the group node within the required node of the Gather tree. Block 650 asks whether this child node is a CAPTION node, representing a CAPTION tag such as that shown in FIG. 3C at 374. If this test has a positive result, control transfers to Block 660 to process the caption information. Otherwise, the caption processing is bypassed by transferring control to Block 700 of FIG. 7. (As stated with reference to element 374 of FIG. 3C, <CAPTION> tags are optional. The flowcharts of the preferred embodiment provide for transferring the CAPTION information to the output DOM when present, and bypassing the transfer process if a CAPTION tag was not used.) At Block 660, the caption node and its associated value are copied from the Gather tree (where the GDOM pointer is pointing to them) to the output DOM tree, as a child node of the group node currently pointed to by the ORG pointer. This caption node is illustrated in FIG. 3D at 397. Block 670 then moves the GDOM pointer to the next child in the Gather tree (i.e. the sibling of the caption node). Therefore, when control next transfers to Block 700, the GDOM pointer will be pointing to a data entity node.

Block 700 checks to see if the last child of the required group has been reached (i.e. the last required data entity has already been processed). If so, this test has a positive result and control transfers to Block 800 of FIG. 8. Otherwise, processing continues at Block 710. Block 710 obtains the identifier specified for the current data entity, to which the GDOM pointer is pointing. On the first iteration of this logic with the example shown in FIG. 3C, this is the identifier "First-Name" (see element 377). This identifier is stored into the variable SID. Block 720 then locates the node in the clone tree having this same identifier. Block 730 checks whether the node from the clone tree was located. If not, then a required data entity is missing from the source data, and this is an error. Control transfers to Block 740, where an appropriate error condition is signaled. Processing then ends.

When the test as Block 730 has a positive result, however, processing continues at Block 750 where the node in the clone tree having the identifier matching the SID value is moved to the output DOM tree. This node will be a child of the group node currently pointed to by the ORG pointer. Note that references herein to "moving" a node from the clone tree to the output DOM tree mean that (1) a copy of the node from the clone tree, including any descendants the node may have, will now appear in the output tree, and (2) the node (including any descendants) is now removed or pruned from the clone tree. (A node will have descendants when a GROUP in the input had nested groups within it, as discussed earlier.) Block 760 then moves the GDOM pointer to point to the next child in the required group of the Gather tree. In the first iteration through the logic of FIG. 7, this moves the GDOM pointer to point to the node containing the data entity having the identifier "Middle-Name" (shown at 378). It will be obvious to one of ordinary skill in the art how this pointer, as well as the other pointers described for the preferred embodiment, move during the various iterations. Following Block 760, control again reaches Block 700. The logic of Blocks 700 through 760 is repeated until the last child has been processed, creating a node in the output DOM tree corresponding to each required data entity (and deleting the corresponding node from the clone tree).

Figure 8:
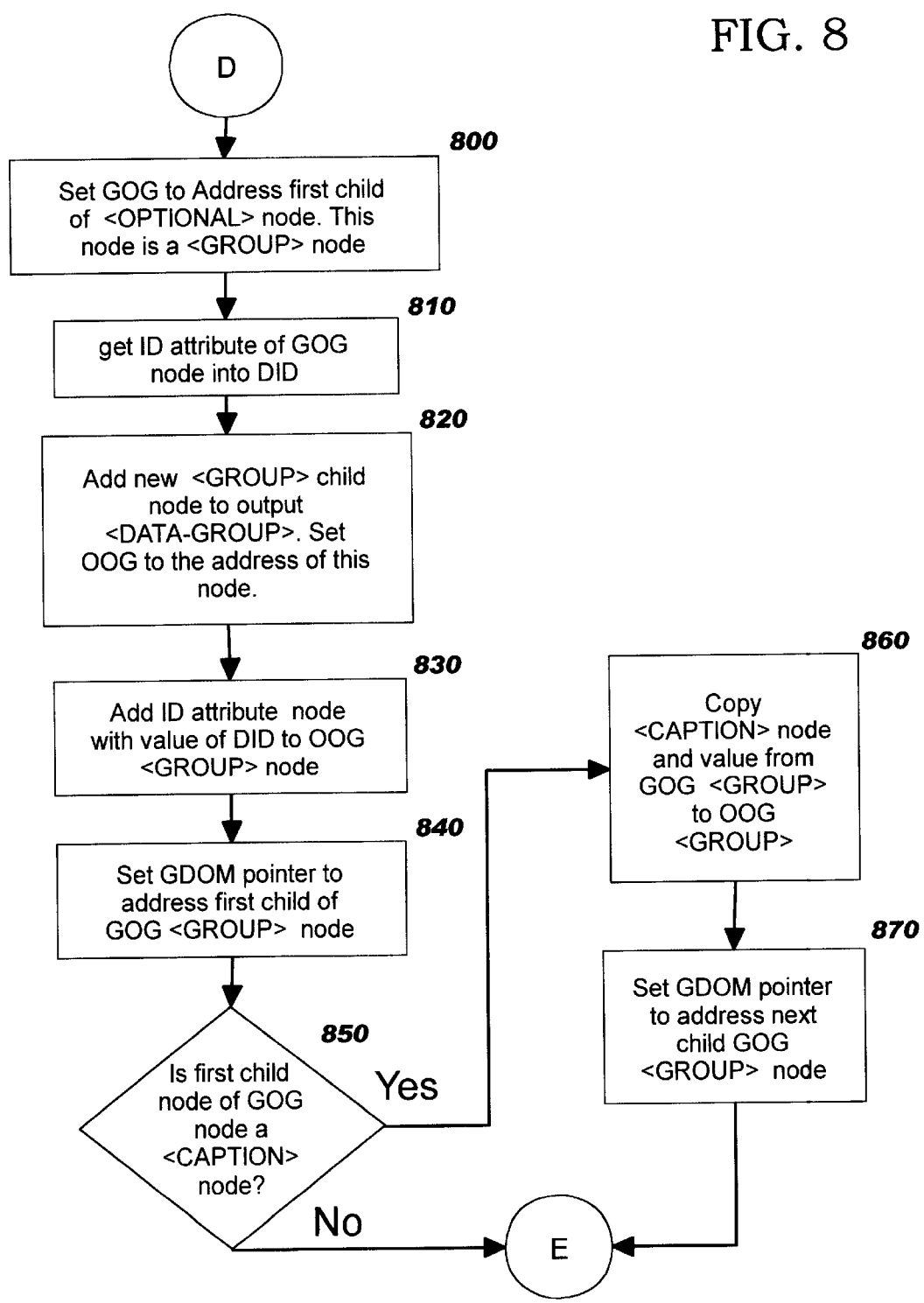

Upon reaching Block 800 of FIG. 8, the required data entities have all been processed successfully. FIG. 8 then begins the processing of the optional data entities which were specified by the user in the OPTIONAL group 380 of the GATHER verb. Block 800 sets the pointer GOG ("Gather Optional Group") to the node in the Gather tree that contains the keyword "<OPTIONAL>". As indicated in Block 800, this is a group node. Referring to the example GATHER verb in FIG. 3C, this is the group node identified at 381. Block 810 obtains the value of the ID attribute for this group node, storing it into the variable DID.

Block 820 creates a new node in the output DOM, as a (second) child of the DATA-GROUP node. This child node is of the type GROUP, and will be used to group all the data entities together that the user specified on the GATHER verb as being optional. A pointer OOG ("Output Optional Group") is set to point to this node's address. Block 830 then associates the identifier stored by Block 810 in the variable DID with this new group node.

Block 840 moves the GDOM pointer to point to the first child of the group node within the optional node of the Gather tree (i.e. the first child of the node pointed to by the GOG pointer). Block 850 asks whether this child node is a CAPTION node, representing a CAPTION tag. If this test has a positive result, control transfers to Block 860 to process the caption information. Otherwise, the caption processing is bypassed by transferring control to Block 900 of FIG. 9. At Block 860, the caption node and its associated value are copied from the Gather tree (where the GDOM pointer is pointing to them) to the output DOM tree, as a child node of the group node currently pointed to by the OOG pointer. Block 870 then moves the GDOM pointer to the next child in the Gather tree (i.e. the sibling of the caption node). Thus, when control next transfers to Block 900, the GDOM pointer will be pointing to a data entity node.

Figure 9:
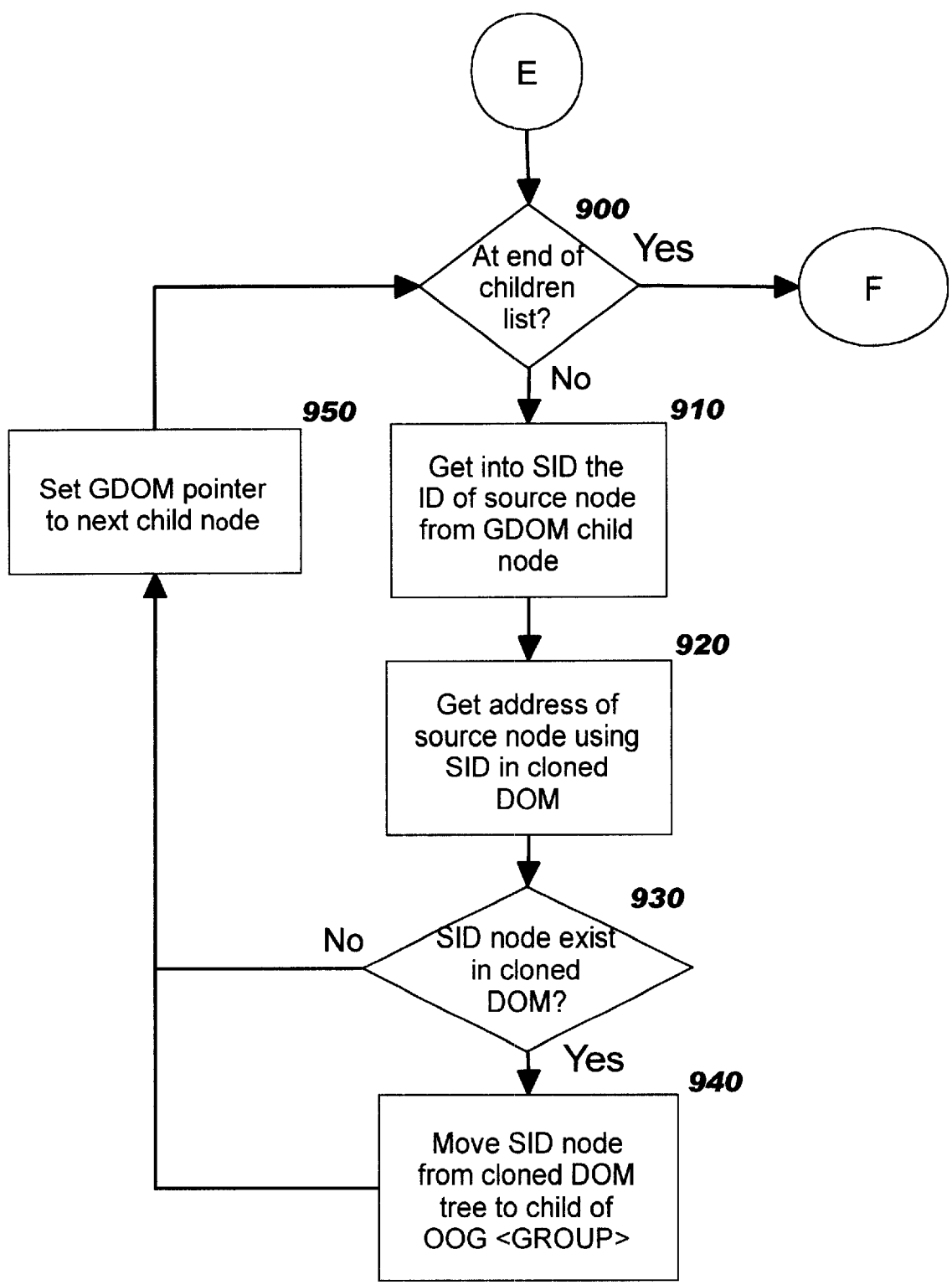

Block 900 in FIG. 9 checks to see if the last child of the optional group has been reached (i.e. the last optional data entity has already been processed). If so, this test has a positive result and control transfers to Block 1000 of FIG. 10. Otherwise, processing continues at Block 910. Block 910 obtains the identifier specified for the current data entity of the Gather tree, to which the GDOM pointer is pointing. On the first iteration of this logic with the example shown in FIG. 3C, this is the identifier "Nickname" (shown at 383). This identifier is stored into the variable SID. Block 920 then locates the node in the clone tree having this same identifier. Block 930 checks whether the node from the clone tree was located. If not, then an optional data entity is not present in the source data, and control simply transfers to Block 950. In other words, this is not an error condition, but instead represents part of the flexible adaptation provided by the present invention.

When the test as Block 930 has a positive result, however, processing continues at Block 950 where the node in the clone tree having the identifier matching the SID value is moved to the output DOM tree. This node will be a child of the group node currently pointed to by the OOG pointer. Block 950 then moves the GDOM pointer to point to the next child in the optional group of the Gather tree. In the first iteration through the logic of FIG. 9, this moves the GDOM pointer to point to the node containing the data entity having the identifier "Mainframe-Identifier" (element 384 in FIG. 3C). Following Block 950, control again reaches Block 900. The logic of Blocks 900 through 950 is repeated until the last child has been processed, creating a node in the output DOM tree corresponding to each optional data entity (and deleting the corresponding node from the clone tree).

Figure 10:
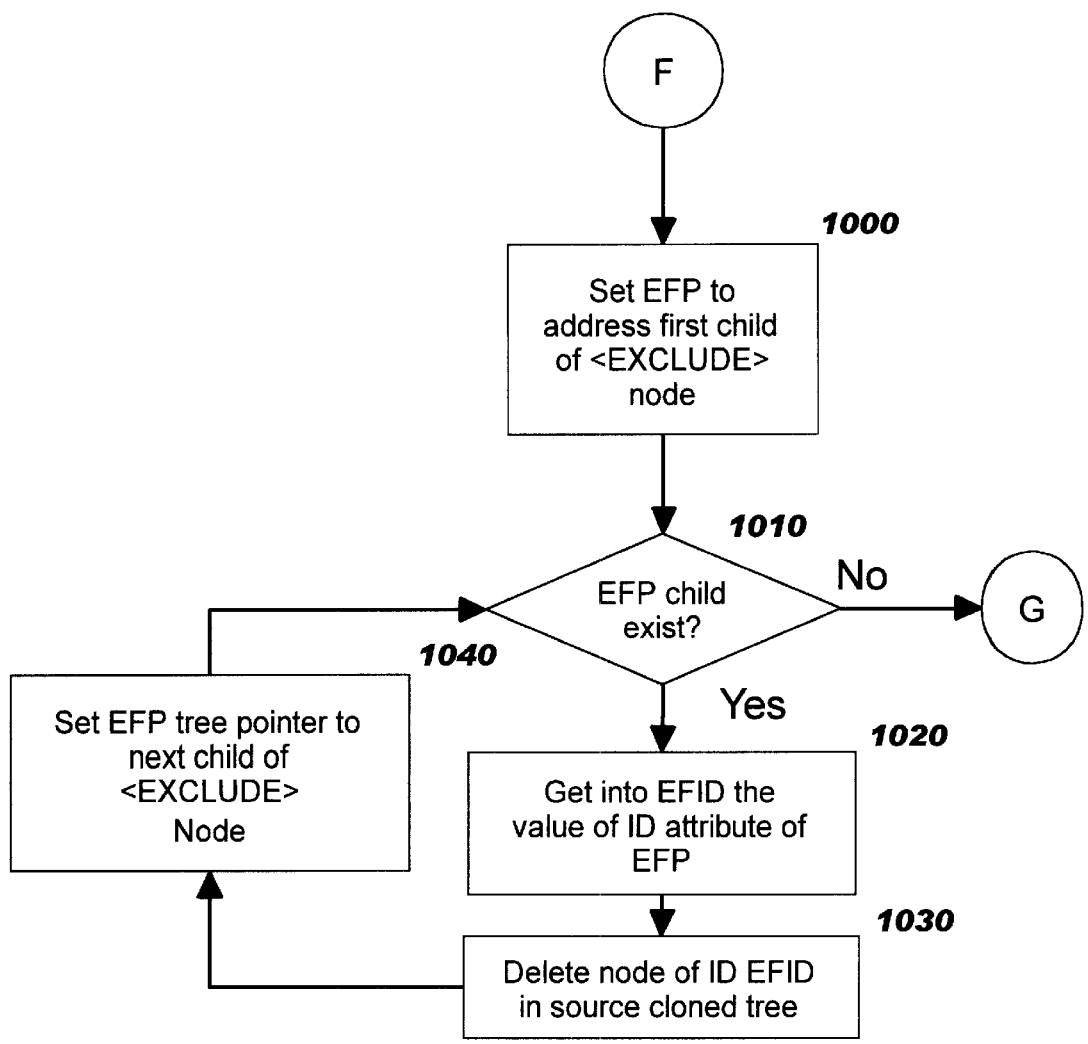

Upon reaching Block 1000 of FIG. 10, the optional data entities have all been processed. FIG. 10 then begins the processing of the data entities which were specified by the user on the GATHER verb as being excluded (i.e. in the EXCLUDE group 390) during the transformation process. Block 1000 sets the pointer EFP ("Excluded Fields Pointer") to the first child of the node in the Gather tree that contains the keyword "<EXCLUDE>". Referring to the example GATHER verb in FIG. 3C, this is the child node corresponding to element 391. Block 1010 asks whether such a child node exists for the exclude node in the Gather tree. If this test has a negative result, then no data entities are to be excluded, and control transfers to Block 1100 of FIG. 11. Otherwise, processing continues at Block 1020 where the value of the ID attribute for this child node is obtained, storing it into the variable EFID ("Excluded Field Identifier"). Referring to FIG. 3C, the first iteration of this logic stores the string "Maiden-Name" into EFID. This exclusion processing will be useful for information that may be considered sensitive, and provides an efficient way of suppressing this information from further processing by omitting it from the output tree. "Maiden-Name" has been chosen here as illustrative of sensitive information, as it may be used in some cases as a type of user password or secret code. Similarly, an employee's identification number may be considered sensitive, and FIG. 3C shows this information (element 392) as being another excluded data entity. Block 1030 locates the node in the clone tree having the identifier stored by Block 1020 in the variable EFID, and deletes this node from the clone tree. Block 1040 then moves the EFP pointer to the next child of the EXCLUDE node in the Gather tree. Following Block 1040, control again reaches Block 1010. The logic of Blocks 1010 through 1040 is repeated until the last child has been processed, excluding each corresponding node from the output DOM tree (and deleting the corresponding node from the clone tree).

Figure 11:
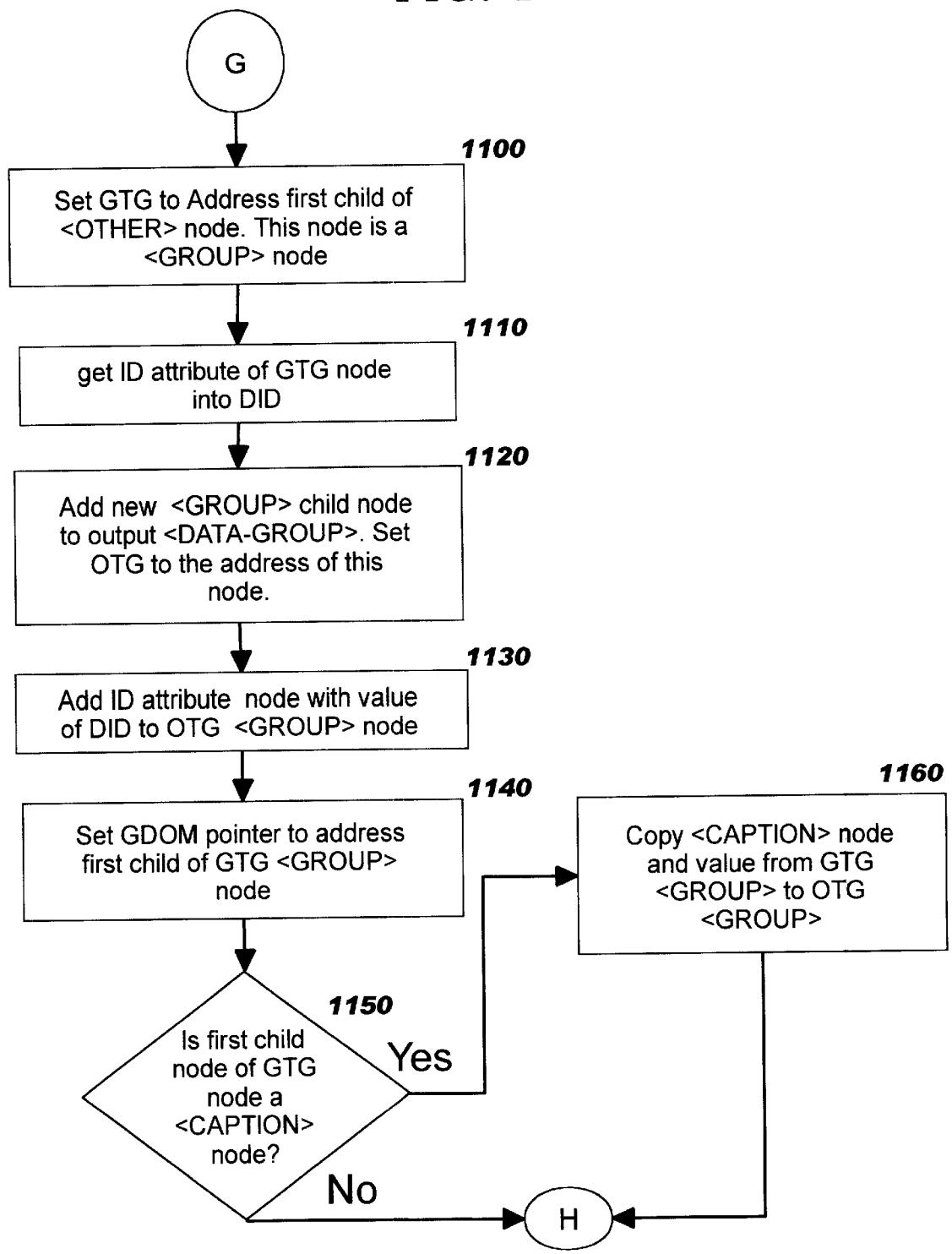

Upon reaching Block 1100 of FIG. 11, the data entities to be excluded have all been processed. FIG. 11 then begins the processing of the data entities which for which no specification was made by the user on the GATHER verb. This processing provides further adaptation of the formatted destination data structured from the information in the unpredictable source data structure. Upon completion of the processing of FIGS. 11 and 12, each data entity the user did not explicitly address on the GATHER verb will have been gathered up and grouped together in the output DOM tree. Referring to the example in FIG. 3, these items will be located as children of node 398 in FIG. 3D. Thus, all information from the data record can be conveniently made available for processing, without knowing its structure in advance and without specifying code to transfer each individual field from the source to the destination.

Block 1100 begins the process of gathering the unspecified data entities by setting the GTG pointer ("Gather Other Group") to the node in the Gather tree that contains the keyword "<OTHER>". As indicated in Block 1100, this is a group node. (Note that a separate <GROUP> node within the <OTHER> node is not used, as was the case with the <REQUIRED> and <OPTIONAL> group nodes. This is because there is no further information specified within the OTHER node of the GATHER verb that needs to be grouped together.) Referring to the example GATHER verb in FIG. 3C, this is the node identified at 394. Block 1110 obtains the value of the ID attribute for this node, storing it into the variable DID.

Block 1120 creates a new node in the output DOM, as a (third) child of the DATA-GROUP node. This child node is of the type GROUP, and will be used to group all the data entities together that the user did not specify on the GATHER verb, as stated above. A pointer OTG ("Output Other Group") is set to point to this node's address. Block 1130 then associates the identifier stored by Block 1110 in the variable DID with this new group node.

Block 1140 moves the GDOM pointer to point to the first child of the group node within the other node of the Gather tree (i.e. the first child of the node pointed to by the GTG pointer). Block 1150 asks whether this child node is a CAPTION node, representing a CAPTION tag. If this test has a positive result, control transfers to Block 1160 to process the caption information. Otherwise, the caption processing is bypassed by transferring control to Block 1200 of FIG. 12. At Block 1160, the caption node and its associated value are copied from the Gather tree (where the GDOM pointer is pointing to them) to the output DOM tree, as a child node of the group node currently pointed to by the OTG pointer. Control then transfers to Block 1200.

Figure 12:
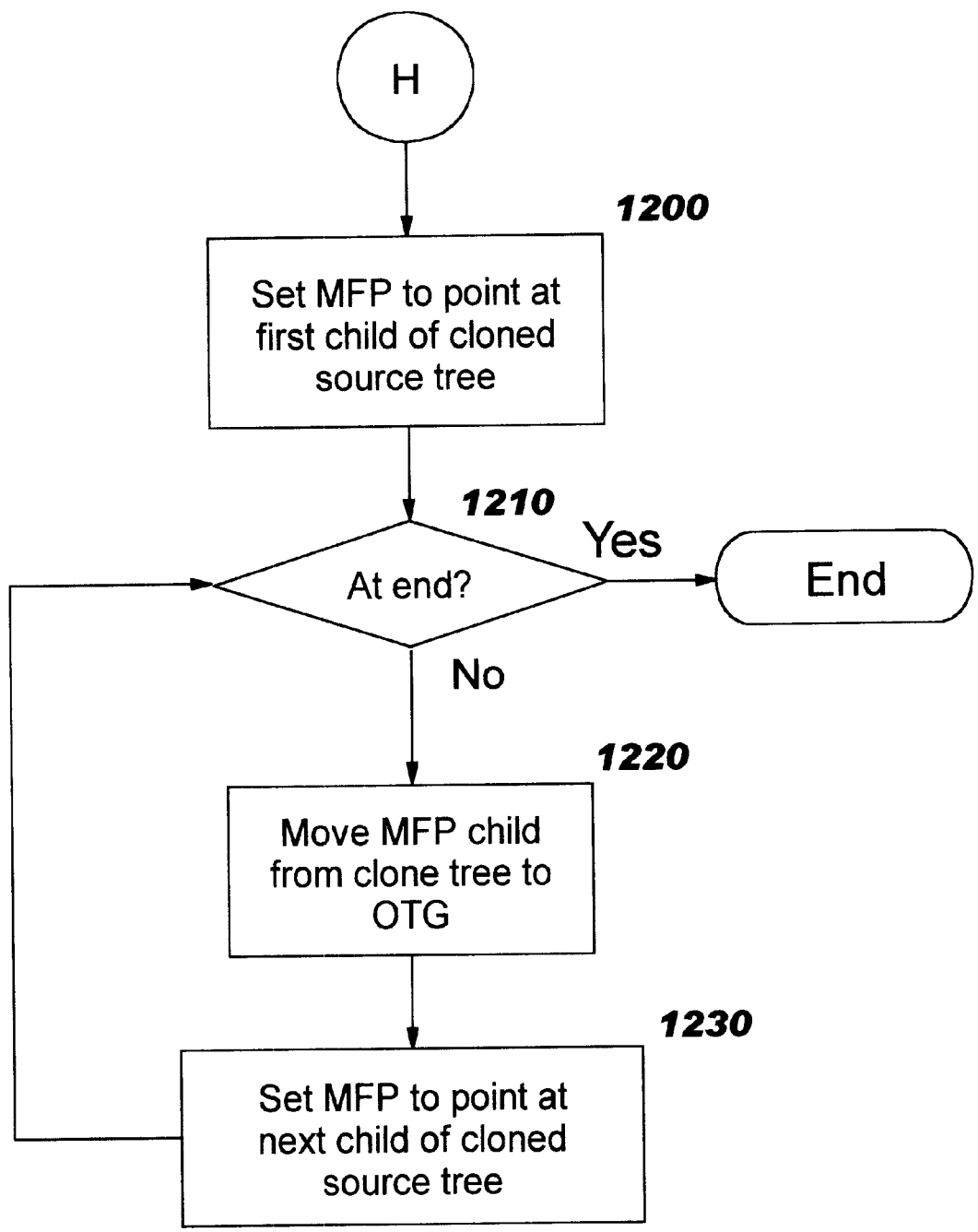

At Block 1200 of FIG. 12, a pointer MFP ("Miscellaneous Fields Pointer") is set to point at the first remaining child in the clone tree. Any nodes that remain in the clone tree at this point correspond to data entities that were not specifically addressed on the GATHER verb. Block 1210 checks to see if a child node is being pointed to. If there is no child on the first iteration through the logic of FIG. 12, then there were no data entities unaccounted for by the GATHER verb. The transformation process is complete, and control exits from FIG. 12. Otherwise, there is at least one child node remaining in the clone tree. Block 1220 moves this child node (pointed to by the MFP pointer) from the clone tree to the output DOM tree as a child node of the group node currently pointed to by the OTG pointer. Block 1230 then moves the MFP pointer to the next child in the clone tree, and control returns to Block 1210. Block 1210 will have a negative result when the last child from the clone tree has been transferred to the output DOM tree. The logic of Blocks 1210 through 1230 is repeated until this occurs, at which time the output DOM tree will contain the completely transformed source data. Referring to the source data group 300 in FIG. 3A and the GATHER verb 360 in FIG. 3C, it can be seen that the items unaccounted for are those of the group having identifier "Home-Address" at 323. This group comprises 4 nodes, 3 of type STRING and 1 of type NUMBER. Accordingly, in the output DOM tree of FIG. 3D, the OTHER group node 396 has 4 child nodes representing the STRING and NUMBER data items (as well as a child node for the CAPTION). FIG. 3E shows these data items collected in the group having identifier "OtherFieldsGroup" 399.

The syntax used for keywords in the above discussions and in the examples of operation of the present invention is merely an illustrative syntax: any alternative keyword or keyword string can be used equivalently without deviating from the inventive concepts of the present invention, provided of course that no conflicting semantics are defined for that alternative syntax and that the implementation is adapted to process that syntax.

In an optional enhancement to the preferred embodiment, the results of a database query can be used as the source data group. Specifically, the results of an LDAP query from an LDAP directory can be used as the source data. LDAP is a popular communications protocol is used to access stored information in an on-line directory, such as X.500 directories. LDAP is an abbreviation for "Lightweight Directory Access Protocol", and is specified as IETF (Internet Engineering Task Force) RFC (Request For Comments) 2251. (Note that LDAP does not require X.500 directory services, and many implementations of LDAP use directory stores other than those defined by X.500.) When using LDAP with such a directory, the queries to the database (and the results of these queries) may be specified using a proxy that translates between LDAP API (application programming interface) calls and XML syntax. What is required for this optional enhancement is that such a proxy (or an equivalent translation facility) is available and performs a transformation of the query results into the XML notation or input DOM tree structure meeting the formatting requirements of the present invention as discussed above (and illustrated by the examples in FIGS. 3A and 3B). These formatting requirements include creating a source data group identifier and associating it with the formatted results in order that operation of the GATHER function can locate the data to use as input.

Note that the word "file" is used in this disclosure to refer to stored data. This is for ease of reference only, and is not meant to imply any particular structure for storing the data, such as conventional "flat files". The data with which the present invention may be beneficially used may be stored in any number of ways without deviating from the inventive concepts disclosed herein, such as: a data element in a database, an object attribute in a directory entry, an object in flash memory, etc.

While the preferred embodiment of the present invention has been described, additional variations and modifications in that embodiment may occur to those skilled in the art once they learn of the basic inventive concepts. The techniques disclosed herein are based partially upon certain predefined characteristics of the XML notation. It will be obvious to one of ordinary skill in the art that the inventive concepts disclosed herein may be adapted to changes in the notation, should they occur. The inventive concepts may also be used with notations other than XML that provide the same characteristics described herein for XML documents, and with modelling techniques other than DOM trees that exhibit the required properties discussed for DOM trees (i.e. the modelling technique creates a tree that represents the structure and content described in the particular notation.) In addition, data structures specified in notations other than XML may use the present invention advantageously, provided the semantics used by the present invention (such as identifying required groups of data, data items within groups, etc.) are supported by that alternative notation. Therefore, it is intended that the appended claims shall be construed to include both the preferred embodiment and all such variations and modifications as fall within the spirit and scope of the invention.

We claim:

1. Computer readable code readable by a computer system in a computing environment for gathering data having dynamically variable record formats such as those created when a dynamic schema is used with a data repository, comprising:
    an input data source comprising one or more records, wherein each of said records has said dynamically variable record format, and wherein said dynamically variable record format of each said record comprises a plurality of dynamically variable fields;
    a subprocess for processing a gather verb specification, wherein said gather verb specification identifies a selected one of said records from said input data source and an output data destination;
    a subprocess for gathering said dynamically variable fields from said selected one of said records according to said gather verb specification; and
    a subprocess for transferring said gathered dynamically variable fields to said output data destination according to said gather verb specification, wherein said subprocess for gathering and said subprocess for transferring flexibly adapt to a presence or an absence of said dynamically variable fields.

2. Computer readable code for gathering data having dynamically variable record formats according to claim 1, wherein said selected record is formatted as a first Document Object Model (DOM) tree, said gather verb specification is formatted as a second DOM tree, and said output data destination is formatted as a third DOM tree.

3. Computer readable code for gathering data having dynamically variable record formats according to claim 2, wherein said first DOM tree is created by a subprocess for parsing an Extended Markup Language (XML) representation of said selected record and said second DOM tree is created by a subprocess for parsing an XML representation of said gather verb specification.

4. Computer readable code for gathering data having dynamically variable record formats according to claim 1, wherein:

said gather verb specification further identifies: a required group of fields, an optional group of fields, an excluded group of fields, and an other group of fields, wherein one or more of said optional group, said excluded group, and said other group may be empty;

wherein said subprocess for gathering further comprises:
a first subprocess for locating a field from said dynamically variable fields corresponding to each of said fields in said required group, and generating an error if any of said fields in said required group cannot be located;
a second subprocess for locating a field from said dynamically variable fields corresponding to each of said fields in said optional group if said corresponding field is present in said selected record;
a third subprocess for locating a field from said dynamically variable fields corresponding to each of said fields in said excluded group if said corresponding field is present in said selected record; and
fourth subprocess for locating all fields from said dynamically variable fields that did not correspond to any of said fields in said required, optional, or excluded groups; and wherein said subprocess for transferring further comprises:
a fifth subprocess for transferring each of said fields located by said first subprocess for locating to a corresponding required output field in said output data destination;
a sixth subprocess for transferring each of said fields located by said second subprocess for locating to a corresponding optional output field in said output data destination;
a seventh subprocess for preventing transfer of each of said fields located by said third subprocess for locating to said output data destination; and
an eighth subprocess for transferring each of said fields located by said fourth subprocess for locating to a corresponding other output field in said output data destination.

5. Computer readable code for gathering data having dynamically variable record formats according to claim 1, wherein said input data source represents a result of a query from a directory database.

6. Computer readable code for gathering data having dynamically variable record formats according to claim 5, wherein said directory database is accessed using a Lightweight Directory Access Protocol (LDAP).

7. A system in a computing environment for gathering data having dynamically variable record formats such as those created when a dynamic schema is used with a data repository, comprising:

an input data source comprising one or more records, wherein each of said records has said dynamically variable record format, and wherein said dynamically variable record format of each said record comprises a plurality of dynamically variable fields;

means for processing a gather verb specification, wherein said gather verb specification identifies a selected one of said records from said input data source and an output data destination;

means for gathering said dynamically variable fields from said selected one of said records according to said gather verb specification; and means for transferring said gathered dynamically variable fields to said output data destination according to said gather verb specification, wherein said means for gathering and said subprocess for transferring flexibly adapt to a presence or an absence of said dynamically variable fields.

8. The system for gathering data having dynamically variable record formats according to claim 7, wherein said selected record is formatted as a first Document Object Model (DOM) tree, said gather verb specification is formatted as a second DOM tree, and said output data destination is formatted as a third DOM tree.

9. The system for gathering data having dynamically variable record formats according to claim 8, wherein said first DOM tree is created by a means for parsing an Extended Markup Language (XML) representation of said selected record and said second DOM tree is created by a means for parsing an XML representation of said gather verb specification.

10. The system for gathering data having dynamically variable record formats according to claim 7, wherein:

said gather verb specification further identifies: a required group of fields, an optional group of fields, an excluded group of fields, and an other group of fields, wherein one or more of said optional group, said excluded group, and said other group may be empty;

wherein said means for gathering further comprises:
first means for locating a field from said dynamically variable fields corresponding to each of said fields in said required group, and generating an error if any of said fields in said required group cannot be located;
second means for locating a field from said dynamically variable fields corresponding to each of said fields in said optional group if said corresponding field is present in said selected record;
third means for locating a field from said dynamically variable fields corresponding to each of said fields in said excluded group if said corresponding field is present in said selected record; and
fourth means for locating all, fields from said dynamically variable fields that did not correspond to any of said fields in said required, optional, or excluded groups; and wherein said means for transferring further comprises:
fifth means for transferring each of said fields located by said first means for locating to a corresponding required output field in said output data destination;
sixth means for transferring each of said fields located by said second means for locating to a corresponding optional output field in said output data destination;
seventh means for preventing transfer of each of said fields located by said third means for locating to said output data destination; and
eighth means for transferring each of said fields located by said fourth means for locating to a corresponding other output field in said output data destination.

11. The system for gathering data having dynamically variable record formats according to claim 7, wherein said input data source represents a result of a query from a directory database.

12. The system for gathering data having dynamically variable record formats according to claim 11, wherein said directory database is accessed using a Lightweight Directory Access Protocol (LDAP).

13. A method for gathering data having dynamically variable record formats such as those created when a dynamic schema is used with a data repository in a computing environent, comprising the steps of:

provicing an input data source comprising one or more records, wherein each of said records has said dynamically variable record format, and wherein said dynamically variable record format of each said record comprises a plurality of dynamically variable fields;

processing a gather verb specification, wherein said gather verb specification identifies a selected one of said records from said input data source and an output data destination;

gathering said dynamically variable fields from said selected one of said records according to said gather verb specification; and transferring said gathered dynamically variable fields to said output data destination according to said gather verb specification, wherein said gathering step and said transferring step flexibly adapt to a presence or an absence of said dynamically variable fields.

14. The method for gathering data having dynamically variable record formats according to claim 13, wherein said selected record is formatted as a first Document Object Model (DOM) tree, said gather verb specification is formatted as a second DOM tree, and said output data destination is formatted as a third DOM tree.

15. The method for gathering data having dynamically variable record formats according to claim 14, wherein said first DOM tree is created by the step of parsing an Extended Markup Language (XML) representation of said selected record and said second DOM tree is created by the step of parsing an XML representation of said gather verb specification.

16. The method for gathering data having dynamically variable record formats according to claim 13, wherein:

said gather verb specification further identifies: a required group of fields, an optional group of fields, an excluded group of fields, and an other group of fields, wherein one or more of said optional group, said excluded group and said other group may be empty;

wherein said gathering step further comprises:
a first step for locating a field from said dynamically variable fields corresponding to each of said fields in said required group, and generating an error if any of said fields in said required group cannot be located;
a second step for locating a field from said dynamically variable fields corresponding to each of said fields in said optional group if said corresponding field is present in said selected record;
a third step for locating a field from said dynamically variable fields corresponding to each of said fields in said excluded group if said corresponding field is present in said selected record; and
a fourth step for locating all fields from said dynamically variable fields that did not correspond to any of said fields in said required, optional, or excluded groups; and wherein said transferring step further comprises:
a fifth step for transferring each of said fields located by said first step for locating to a corresponding required output field in said output data destination;
a sixth step for transferring each of said fields located by said second step for locating to a corresponding optional output field in said output data destination;
a seventh step for preventing transfer of each of said fields located by said third step for locating to said output data destination; and
an eighth step for transferring each of said fields located by said fourth step for locating to a corresponding other output field in said output data destination.

17. Computer readable code for gathering data having dynamically variable record formats according to claim 13, wherein said input data source represents a result of a query from a directory database.

18. Computer readable code for gathering data having dynamically variable record formats according to claim 17, wherein said directory database is accessed using a Lightweight Directory Access Protocol (LDAP).

* * * * *